US011982298B2

(12) United States Patent
Xie

(10) Patent No.: US 11,982,298 B2
(45) Date of Patent: May 14, 2024

(54) METHODS, SYSTEMS, APPARATUSES, AND DEVICES FOR FACILITATING IMPROVING FLOW OF FLUID IN A DUCT

(71) Applicant: Jianhui Xie, Toronto (CA)

(72) Inventor: Jianhui Xie, Toronto (CA)

( * ) Notice: Subject to any disclaimer, the term of this patent is extended or adjusted under 35 U.S.C. 154(b) by 269 days.

(21) Appl. No.: 17/729,909

(22) Filed: Apr. 26, 2022

(65) Prior Publication Data

US 2022/0341444 A1 Oct. 27, 2022

Related U.S. Application Data

(60) Provisional application No. 63/179,987, filed on Apr. 26, 2021.

(30) Foreign Application Priority Data

Sep. 10, 2021 (CN) ......................... 202111062491.9

(51) Int. Cl.
*F15D 1/02* (2006.01)

(52) U.S. Cl.
CPC .................................... *F15D 1/025* (2013.01)

(58) Field of Classification Search
CPC ....................................................... F15D 1/025
USPC ...................................................... 138/39, 44
See application file for complete search history.

(56) References Cited

U.S. PATENT DOCUMENTS 3,657,878 A * 4/1972 Kaufmann, Jr. .......... F01N 3/34 60/319
3,774,645 A * 11/1973 Pompa ...................... G01F 1/44 138/44
4,448,111 A 5/1984 Doherty
5,161,371 A * 11/1992 Deville ................... F01N 3/005 60/309
5,174,113 A * 12/1992 Deville ................... F01N 13/20 60/309
5,810,052 A * 9/1998 Kozyuk .................. B01F 25/42 138/40
7,845,465 B2 * 12/2010 Baumgartner ............ F01N 1/14 60/319
8,808,075 B2 8/2014 Gebke
9,451,730 B2 9/2016 Gardner
2003/0022617 A1 * 1/2003 Gebke .................... B01D 46/88 454/306
2016/0121859 A1 5/2016 Weber

* cited by examiner

*Primary Examiner* — David R Deal

(57) ABSTRACT

Disclosed herein is an apparatus for facilitating improving flow of fluid in a duct, in accordance with some embodiments. The apparatus comprises a first portion, a third portion, and a second portion. Further, continuously attaching an inlet edge using an attachment member and an outlet edge defines an interior space. Further, a first amount of the fluid entering a first interior space through an inlet opening flows to a third interior space with a first velocity and a first direction. Further, portions of a second amount of the fluid flows into the third interior space through second openings with a second velocity and second directions. Further, the fluid flows from the third interior space with a third velocity and a cyclonic flow pattern for exiting through an outlet opening based on interacting of the portions of the second amount of the fluid with the first amount of the fluid.

20 Claims, 16 Drawing Sheets

METHODS, SYSTEMS, APPARATUSES, AND DEVICES FOR FACILITATING IMPROVING FLOW OF FLUID IN A DUCT

FIELD OF THE INVENTION

Generally, the present disclosure relates to the field of ventilation. More specifically, the present disclosure relates to methods, systems, apparatuses, and devices for facilitating improving flow of fluid in a duct.

BACKGROUND OF THE INVENTION

HVAC system ensures that air is properly distributed by means of supply and return vents. Once the system heats or cools the air, it blows the air along ducts to the desired locations. Having an insufficient airflow rate can cause hot and cold spots in a house and higher energy costs.

Therefore, there is a need for improved methods, systems, apparatuses, and devices for facilitating improving flow of fluid in a duct that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is an apparatus for facilitating improving flow of fluid in a duct, in accordance with some embodiments. Further, the apparatus may be configured to be fixed within a duct portion of the duct. Further, the apparatus may include a first portion, a third portion, and a second portion. Further, the first portion defines a first interior space between a first end of the first portion and a second end of the first portion. Further, a cross-section of the first portion decreases from the first end of the first portion to the second end of the first portion making the first interior space tapered from the first end of the first portion to the second end of the first portion. Further, the first portion may include an inlet edge on the first end of the first portion defining an inlet opening on the first end of the first portion leading into the first interior space. Further, the third portion defines a third interior space between a first end of the third portion and a second end of the third portion. Further, the cross-section of the third portion remains constant from the first end of the third portion to the second end of the third portion. Further, the second portion defines a second interior space between a first end of the second portion and a second end of the second portion. Further, the second portion may include an outlet edge on the first end of the second portion defining an outlet opening on the first end of the second portion. Further, the second end of the first portion may be coupled with the first end of the third portion and the second end of the second portion may be coupled with the second end of the third portion for fluidly coupling the first interior space, the third interior space, and the second interior space. Further, the inlet edge may be configured to be continuously attached to an interior surface of the duct portion at a first end of the duct portion using a first attachment member of the first portion. Further, the outlet edge may be configured to be continuously attached to the interior surface at a second end of the duct portion. Further, continuously attaching the inlet edge to the first end of the duct portion and continuously attaching the outlet edge at the second end of the duct portion defines an interior space between the interior surface of the duct portion and a first exterior surface of the first portion, a third exterior surface of the third portion, and a second exterior surface of the second portion. Further, the first attachment member may include at least one first opening leading into the interior space. Further, the third portion may include a plurality of second openings for fluidly coupling the interior space with the third interior space. Further, the fluid flows from the first end of the duct portion to the second end of the duct portion through the apparatus. Further, a first amount of the fluid entering the first interior space through the inlet opening flows to the third interior space from the first interior space with a first velocity and a first direction and a second amount of the fluid enters the interior space through the at least one first opening. Further, a plurality of portions of the second amount of the fluid flows into the third interior space through the plurality of second openings with a second velocity and a plurality of second directions corresponding to the plurality of second openings. Further, the plurality of portions of the second amount of the fluid interacts with the first amount of the fluid in the third interior space. Further, the fluid flows from the third interior space to the second interior space with a third velocity and a cyclonic flow pattern for exiting the second interior space through the outlet opening based on interacting of the plurality of portions of the second amount of the fluid with the first amount of the fluid. Further, the third velocity may be greater than the first velocity and the second velocity.

Further disclosed herein is an apparatus for facilitating improving flow of fluid in a duct, in accordance with some embodiments. Further, the apparatus may be configured to be fixed within a duct portion of the duct. Further, the apparatus may include a first portion, a third portion, and a second portion. Further, the first portion defines a first interior space between a first end of the first portion and a second end of the first portion. Further, a cross-section of the first portion decreases from the first end of the first portion to the second end of the first portion making the first interior space tapered from the first end of the first portion to the second end of the first portion. Further, the first portion may include an inlet edge on the first end of the first portion defining an inlet opening on the first end of the first portion leading into the first interior space. Further, the third portion defines a third interior space between a first end of the third portion and a second end of the third portion. Further, the cross-section of the third portion remains constant from the first end of the third portion to the second end of the third portion. Further, the second portion defines a second interior space between a first end of the second portion and a second end of the second portion. Further, a cross-section of the second portion decreases from the first end of the second portion to the second end of the second portion making the second interior space tapered from the first end of the second portion to the second end of the second portion. Further, the second portion may include an outlet edge on the first end of the second portion defining an outlet opening on the first end of the second portion. Further, the second end of the first portion may be coupled with the first end of the third portion and the second end of the second portion may be coupled with the second end of the third portion for fluidly coupling the first interior space, the third interior space, and the second interior space. Further, the inlet edge may be configured to be continuously attached to an interior surface of the duct portion at a first end of the duct portion using a first attachment member of the first portion. Further, the outlet edge may be configured to be continuously attached to the interior surface at a second end of the duct portion. Further, continuously attaching the inlet edge to the first end of the duct portion and continuously attaching the outlet edge at the second end of the duct portion defines an interior space between the interior surface of the duct portion and a first exterior surface of the first portion, a third exterior surface of the third portion, and a second exterior surface of the second portion. Further, the first attachment member may include at least one first opening leading into the interior space. Further, the third portion may include a plurality of second openings for fluidly coupling the interior space with the third interior space. Further, the fluid flows from the first end of the duct portion to the second end of the duct portion through the apparatus. Further, a first amount of the fluid entering the first interior space through the inlet opening flows to the third interior space from the first interior space with a first velocity and a first direction and a second amount of the fluid enters the interior space through the at least one first opening. Further, a plurality of portions of the second amount of the fluid flows into the third interior space through the plurality of second openings with a second velocity and a plurality of second directions corresponding to the plurality of second openings. Further, the plurality of portions of the second amount of the fluid interacts with the first amount of the fluid in the third interior space. Further, the fluid flows from the third interior space to the second interior space with a third velocity and a cyclonic flow pattern for exiting the second interior space through the outlet opening based on interacting of the plurality of portions of the second amount of the fluid with the first amount of the fluid. Further, the third velocity may be greater than the first velocity and the second velocity.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

Figure 1:
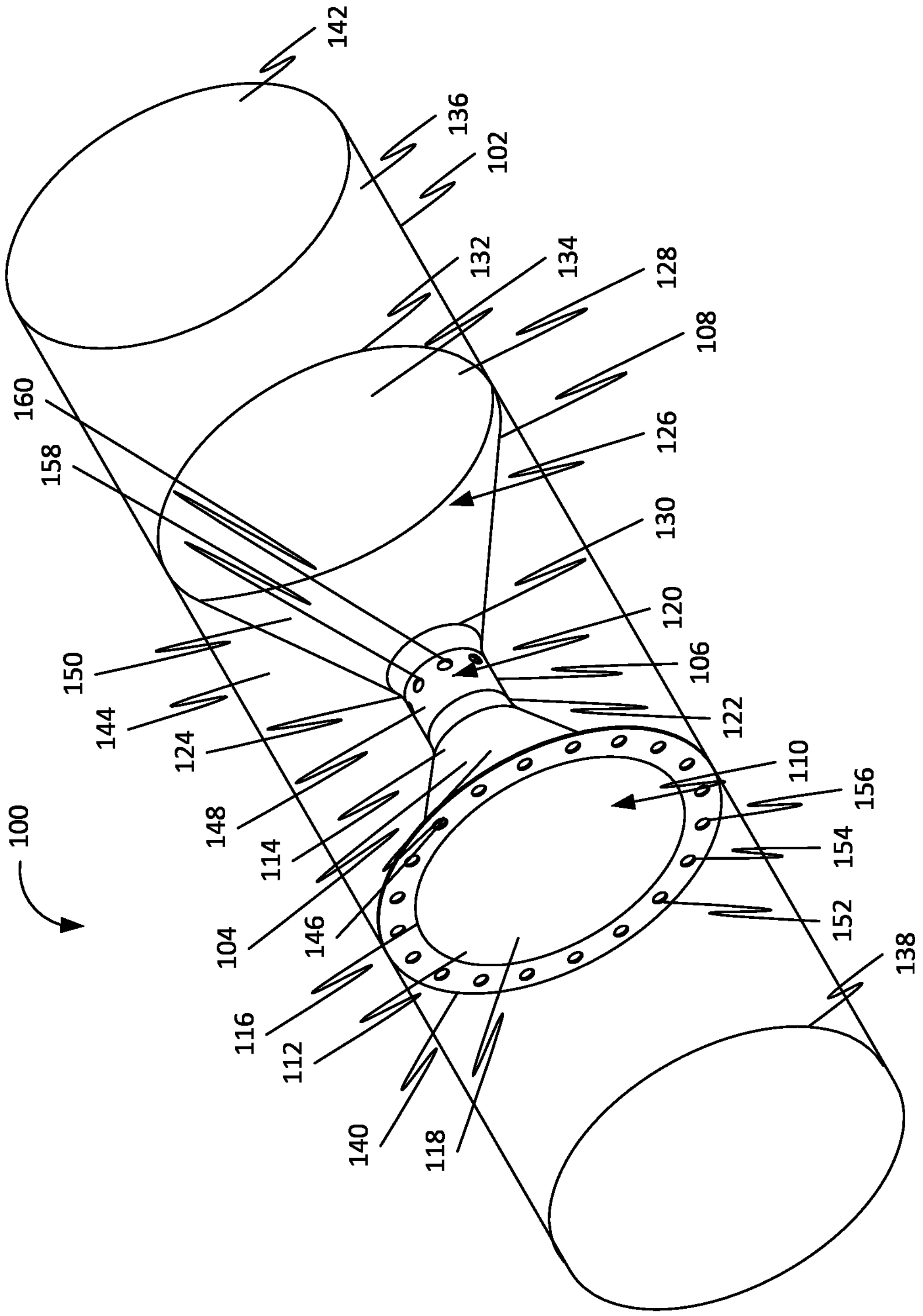
FIG. 1 is a top perspective view of an apparatus for facilitating improving flow of fluid in a duct with a duct portion of the duct, in accordance with some embodiments.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, “a” and “an” each generally denotes “at least one,” but does not exclude a plurality unless the contextual use dictates otherwise. When used herein to join a list of items, “or” denotes “at least one of the items,” but does not exclude a plurality of items of the list. Finally, when used herein to join a list of items, “and” denotes “all of the items of the list.”

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of methods, systems, apparatuses, and devices for facilitating improving flow of fluid in a duct, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer etc.) and/or possession of a machine readable secret data (e.g. encryption key, decryption key, bar codes, etc.) and/or or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smart-card with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

The present disclosure describes methods, systems, apparatuses, and devices for facilitating improving the flow of fluid in a duct. Further, the present disclosure describes an apparatus that can be mounted inside heating, ventilating, and air conditioning (HVAC) pipes to accelerate the airflow.

Further, the present disclosure describes a Venturi-like tube that can be mounted inside an HVAC pipe for accelerating the airflow, functioning like a cyclonic generator at preset conditions. Another objective of the present invention is to provide various designs of the tube so that they can be mounted on any type of HVAC pipe.

Further, the present disclosure describes a cyclonic generator with an upgraded Venturi-like tube. Further, the present disclosure describes the "Cyclone Airflow Booster" which accelerates the airflow but not limited to, the HVAC system, and the ventilation system of the automobile or vessel. Further, the disclosed apparatus allows sufficient airflow and prevents hot and cold spots. In a preferred embodiment, the disclosed apparatus comprises an entrance cone, a throat, and an exit cone. The air flows through the entrance cone, accelerates in the throat, and exits through the exit cone.

Further, the entrance cone provides a hollow cone structure, although any desired shape or design may be used. In the preferred embodiment, the entrance cone comprises a flat surface on the initial entrance. The flat surface further comprises a plurality of air holes so that hot air can go through, where its edge is fused with the inner wall of the HVAC pipe.

Further, the throat provides a hollow cylindrical structure, or any desired shape may be used. The throat connects the entrance cone and the exit cone. The throat comprises a plurality of non-perpendicular air holes on the side surface. The plurality of non-perpendicular air holes of the throat is not perpendicular to the throat wall surface. The hot air flows into the throat through the plurality of non-perpendicular air holes in either clockwise or counterclockwise direction, creating a crosswind in the same direction.

Further, the exit cone provides, but not limited to, a hollow cone, square, or rectangular structure, where its edge is fused with the inner wall of the HVAC pipe. The accelerated air from the throat passes through the exit cone and dashes away to the further end of the HVAC pipe.

In the preferred embodiment, a heater that drives up the air temperature is equipped at the HVAC pipe before the entrance cone. The heater increases the air pressure around the entrance cone, accelerating the airflow rate. According to the Venturi effect, the accelerated air coming into the entrance cone will be swiftly multiplied at the throat and the intensity of pressure is much lower inside the throat. With the warm or hot air, the accelerated air inside the HVAC pipe will swiftly pass the throat and meets the crosswind, and form a cyclonic wind flying over the throat onto the exit cone. The air is sucked and pulled dashing onto the further end of the HVAC pipe at multiplied accelerated speed compared to the entrance cone.

In the preferred embodiment, the disclosed apparatus comprises an optional humidifier at the entrance cone. The air can be humid enough to raise the hot air pressure intensity, which will dash away to the exit cone, mixed up with the crosswind in the form of a tornado.

Further, the present disclosure describes any tube located inside an airflow pipe with a diminishing entrance channel of any shape coming to the throat of the same size of cross-section extending to a channel of the progressively larger intersection at any shape. The airflow will be accelerated substantially like speedy winds flying into the exit cone in the form of a tornado only with the above three components as well as the aforementioned conditions when needed.

Further, the present disclosure describes a cyclone airflow booster. Further, the cyclone airflow booster is one or more Venturi a tube(s) is mounted inside an HVAC pipe of square or round or any other shape, with its exit cone end sealed with an HVAC pipe wall and the entrance cone end a small gap closed to HVAC pipe wall where air flows in. On the throat of a Venturi-like tube (joining pipe section) some air holes are non-perpendicular to the throat wall surface where flowing air enters into the throat airflow channel (joining pipe section) in the same direction clockwise, creating a cross-wind driving in the same direction clockwise or counterclockwise. The entrance of the HVAC pipe is equipped with a kind of radiator that heats the airflow while another radiator closed to the exit end HVAC pipe also heats the outflow air. On the side of an HVAC, there are regular airflows that will be accelerated to pass the throat section of a Venturi-like tube according to the Venturi effect, while the intensity of pressure is much lower inside the throat section. Meanwhile, some air flows in through the entrance cone end gap to the HVAC pipe and through the non-perpendicular air holes and forms a cross-wind in the same direction clockwise or counterclockwise. With warm or hot airs at both entrance and exit end, the airflow inside the HVAC pipe will swiftly pass the throat section meeting the cross-wind and form a cyclonic wind flying over the throat onto the exit cone, then sucked and pulled dashing onto the further end of HVAC pipe at a much higher speed compared at the entrance. The above-mentioned Venturi-like tube consists of an entrance cone, a throat section, and an exit cone of different shapes. In another word, this Venturi-like tube denotes any tube with a diminishing entrance channel of a certain shape coming to a throat of the same size of cross-section extending to a channel of the progressively larger intersection at any shape. This design can be well applied in HVAC pipes or other circumstances to accelerate the airflow, where right after the filter or other equipment slows down the airflow.

FIG. 1 is a top perspective view of an apparatus 100 for facilitating improving flow of fluid in a duct with a duct portion 102 of the duct, in accordance with some embodiments. Further, the duct may include a pipe, a tube, a passageway, etc. Further, the fluid may include a gas, a liquid, air, water, etc. Further, the apparatus 100 may be configured to be fixed within the duct portion 102 of the duct. Further, the apparatus 100 may include a first portion 104, a third portion 106, and a second portion 108.

Further, the first portion 104 defines a first interior space 110 between a first end 112 of the first portion 104 and a second end 114 of the first portion 104. Further, a cross-section of the first portion 104 decreases from the first end 112 of the first portion 104 to the second end 114 of the first portion 104 making the first interior space 110 tapered from the first end 112 of the first portion 104 to the second end 114 of the first portion 104. Further, the first portion 104 may include an inlet edge 116 on the first end 112 of the first portion 104 defining an inlet opening 118 on the first end 112 of the first portion 104 leading into the first interior space 110. Further, the first portion 104 may include a first hollow conical structure. Further, the first interior space 110 may include a conical interior space. Further, the first portion 104 may be an enter cone.

Further, the third portion 106 defines a third interior space 120 between a first end 122 of the third portion 106 and a second end 124 of the third portion 106. Further, the cross-section of the third portion 106 remains constant from the first end 122 of the third portion 106 to the second end 124 of the third portion 106. Further, the third portion 106 may include a hollow cylindrical structure. Further, the third interior space 120 may include a cylindrical interior space. Further, the third portion 106 may include a throat section.

Further, the second portion 108 defines a second interior space 126 between a first end 128 of the second portion 108 and a second end 130 of the second portion 108. Further, the second portion 108 may include an outlet edge 132 on the first end 128 of the second portion 108 defining an outlet opening 134 on the first end 128 of the second portion 108. Further, the second portion 108 may include a second hollow conical structure. Further, the second interior space 126 may include a conical interior space. Further, the second portion 108 may include an exit cone. Further, the second end 114 of the first portion 104 may be coupled with the first end 122 of the third portion 106 and the second end 130 of the second portion 108 may be coupled with the second end 124 of the third portion 106 for fluidly coupling the first interior space 110, the third interior space 120, and the second interior space 126. Further, the inlet edge 116 may be configured to be continuously attached to an interior surface 136 of the duct portion 102 at a first end 138 of the duct portion 102 using a first attachment member 140 of the first portion 104. Further, the outlet edge 132 may be configured to be continuously attached to the interior surface 136 at a second end 142 of the duct portion 102. Further, continuously attaching the inlet edge 116 to the first end 138 of the duct portion 102 and continuously attaching the outlet edge 132 at the second end 142 of the duct portion 102 defines an interior space 144 between the interior surface 136 of the duct portion 102 and a first exterior surface 146 of the first portion 104, a third exterior surface 148 of the third portion 106, and a second exterior surface 150 of the second portion 108. Further, the first attachment member 140 may include at least one first opening 152-156 leading into the interior space 144. Further, the third portion 106 may include a plurality of second openings 158-160 for fluidly coupling the interior space 144 with the third interior space 120. Further, the fluid flows from the first end 138 of the duct portion 102 to the second end 142 of the duct portion 102 through the apparatus 100. Further, a first amount of the fluid entering the first interior space 110 through the inlet opening 118 flows to the third interior space 120 from the first interior space 110 with a first velocity and a first direction and a second amount of the fluid enters the interior space 144 through the at least one first opening 152-156. Further, a plurality of portions of the second amount of the fluid flows into the third interior space 120 through the plurality of second openings 158-160 with a second velocity and a plurality of second directions corresponding to the plurality of second openings 158-160. Further, the plurality of portions of the second amount of the fluid interacts with the first amount of the fluid in the third interior space 120. Further, the fluid flows from the third interior space 120 to the second interior space 126 with a third velocity and a cyclonic flow pattern for exiting the second interior space 126 through the outlet opening 134 based on interacting of the plurality of portions of the second amount of the fluid with the first amount of the fluid. Further, the third velocity may be greater than the first velocity and the second velocity.

Figure 8:
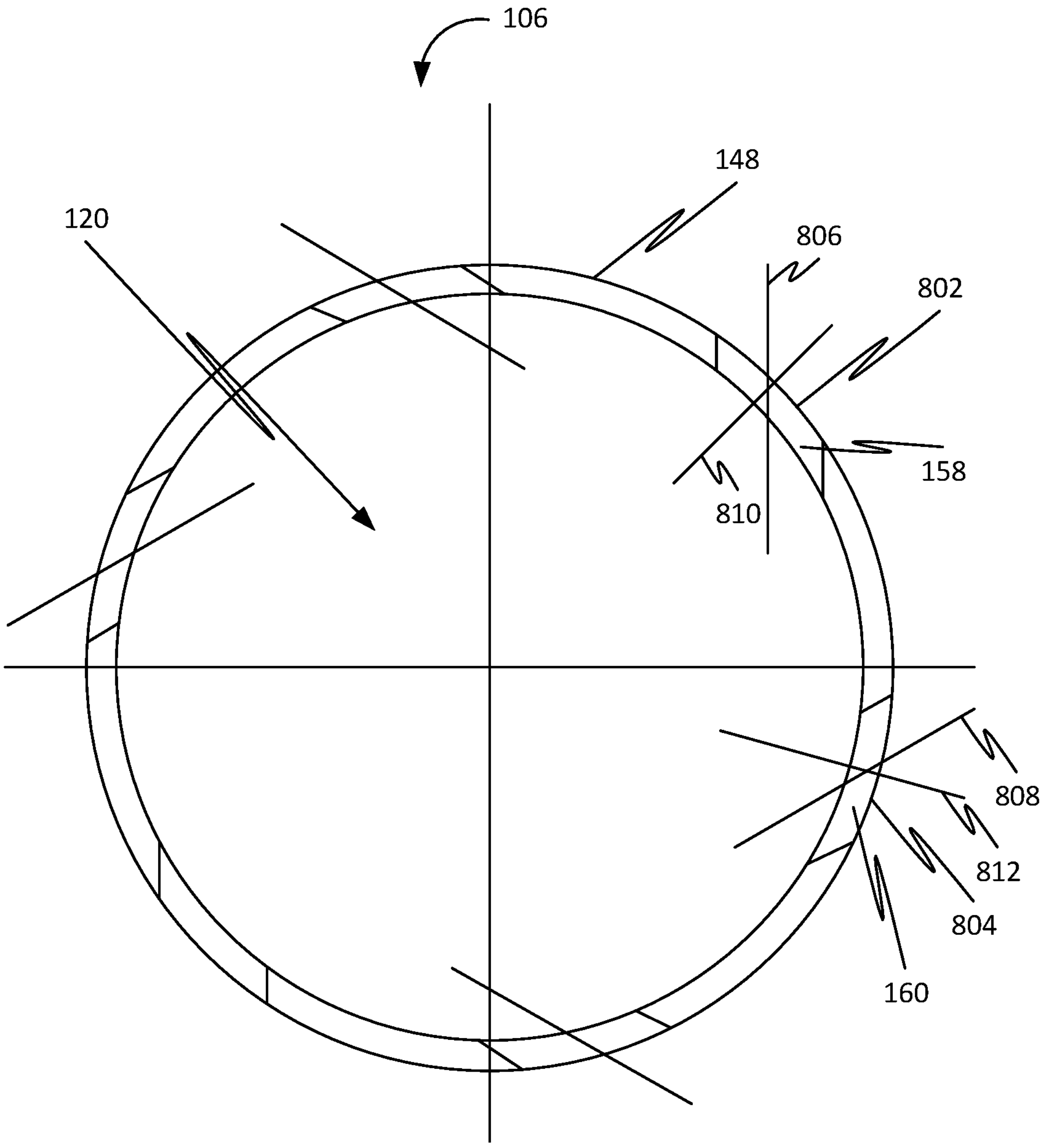
FIG. 8 is a cross-sectional view of the third portion of the apparatus, in accordance with some embodiments.

Further, in some embodiments, the plurality of second openings 158-160 may be disposed on a plurality of surface portions 802-804, as shown in FIG. 8, of the third exterior surface 148. Further, the plurality of second openings 158-160 may be oriented in a plurality of orientations. Further, each axis of a plurality of axes 806-808, as shown in FIG. 8, of each orientation of the plurality of orientations subtends an angle of a plurality of angles with a perpendicular axis (810-812) of each of the plurality of surface portions 802-804. Further, the plurality of second directions corresponds to the plurality of orientations.

Further, in an embodiment, the plurality of angles may be equal.

Further, in an embodiment, the plurality of angles may be unequal.

Figure 9:
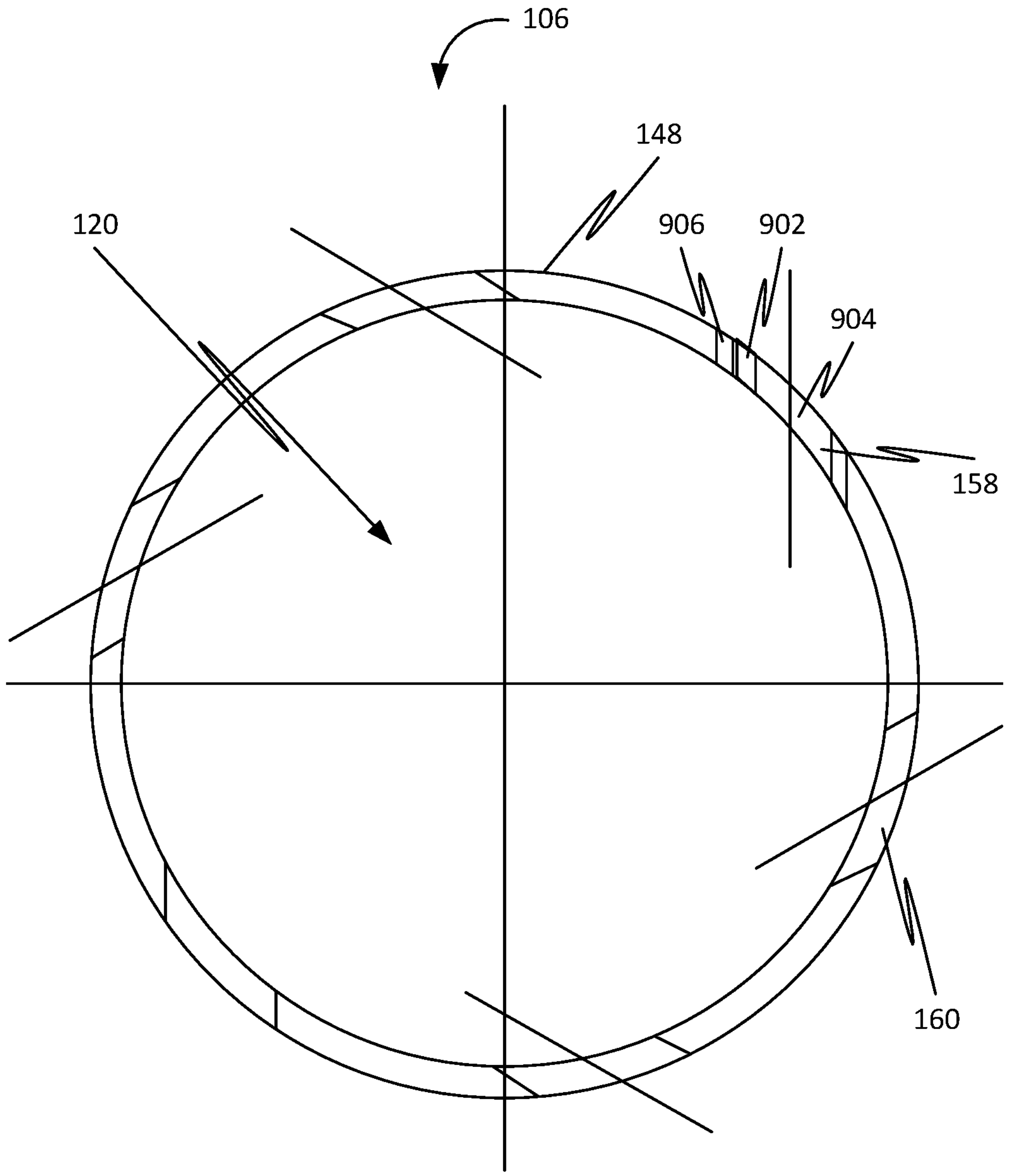
FIG. 9 is a cross-sectional view of the third portion of the apparatus with the orientation control device, in accordance with some embodiments.

In further embodiments, an opening control device 906, as shown in FIG. 9. Further, the opening control device 906 may be coupled with each of the plurality of second openings 158-160. Further, the opening control device 906 may include at least one panel. Further, the at least one panel may be configured for extendably retracting over each of the plurality of second openings 158-160 for transitioning each of the plurality of second openings 158-160 between a closed state and at least one open state. Further, the transitioning of each of the plurality of second openings 158-160 may include varying an aperture of each of the plurality of second openings 158-160. Further, the varying the aperture varies a mass flow rate of the plurality of portions of the second amount of the fluid flows into the third interior space 120 through the plurality of second openings 158-160.

In further embodiments, the apparatus 100 may include an orientation control device 902, as shown in FIG. 9. Further, the orientation control device 902 may be coupled with each of the plurality of second openings 158-160. Further, the orientation control device 902 may be an annular structure defining a central opening 904, as shown in FIG. 9. Further, the orientation control device 902 may be configured to be rotated between a plurality of positions. Further, the plurality of positions corresponds to the plurality of orientations of the central opening 904.

Figure 10:
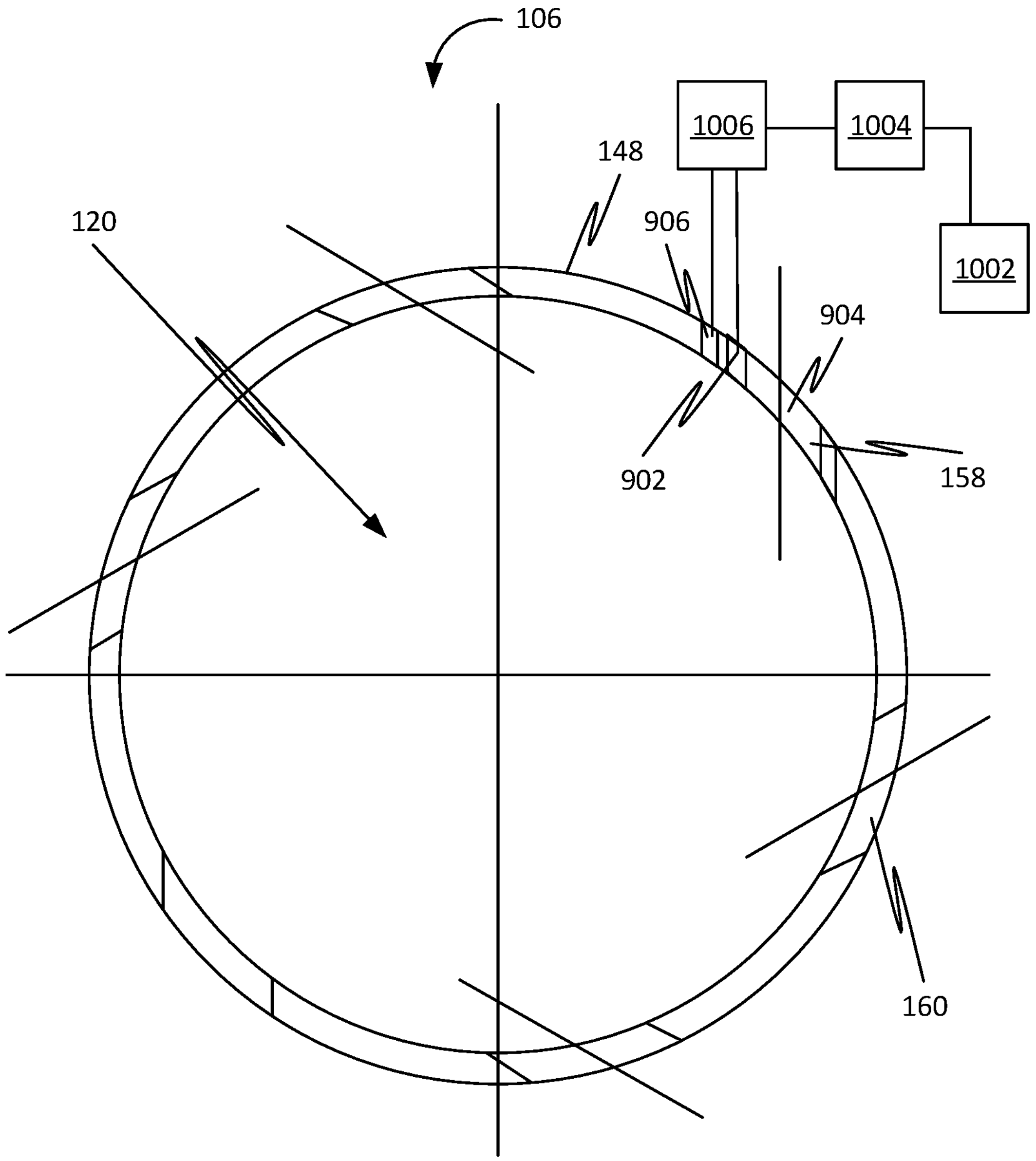
FIG. 10 is a cross-sectional view of the third portion of the apparatus with the orientation control device, in accordance with some embodiments.

In further embodiments, the apparatus 100 may include at least one sensor 1002, a processing device 1004, and at least one actuator 1006, as shown in FIG. 10. Further, the at least one sensor 1002 may be disposed on the first portion 104. Further, the at least one sensor 1002 may be configured for generating at least one sensor data based on detecting a velocity of the fluid flowing through the apparatus 100. Further, the processing device 1004 may be communicatively coupled with the at least one sensor 1002. Further, the processing device 1004 may be configured for analyzing the at least one sensor data based on at least one criterion. Further, the at least one criterion may define the plurality of directions of the plurality of portions of the second amount of the fluid required to create the cyclonic flow pattern with the first amount of the fluid having the first velocity. Further, the processing device 1004 may be configured for determining one of the plurality of orientations for each of the plurality of second openings 158-160 based on the analyzing. Further, the processing device 1004 may be configured for generating a command for the orientation control device 902 based on the determining. Further, the at least one actuator 1006 may be communicatively coupled with the processing device 1004. Further, the at least one actuator 1006 may be operationally coupled with the orientation control device 902. Further, the at least one actuator 1006 may be configured for rotating the orientation control device 902 to one of the plurality of positions corresponding to one of the plurality of orientations based on the command.

Further, in some embodiments, the processing device 1004 may be configured for determining the aperture for each of the plurality of second openings 158-160 based on the analyzing. Further, the processing device 1004 may be configured for generating a third command for the opening control device 906 based on the determining of the aperture for each of the plurality of second openings 158-160. Further, the at least one actuator 1006 may be communicatively coupled with the processing device 1004. Further, the at least one actuator 1006 may be operationally coupled with the opening control device 906. Further, the at least one actuator 1006 may be configured for moving the at least one panel from the closed state to the at least one open state based on the third command.

Figure 11:
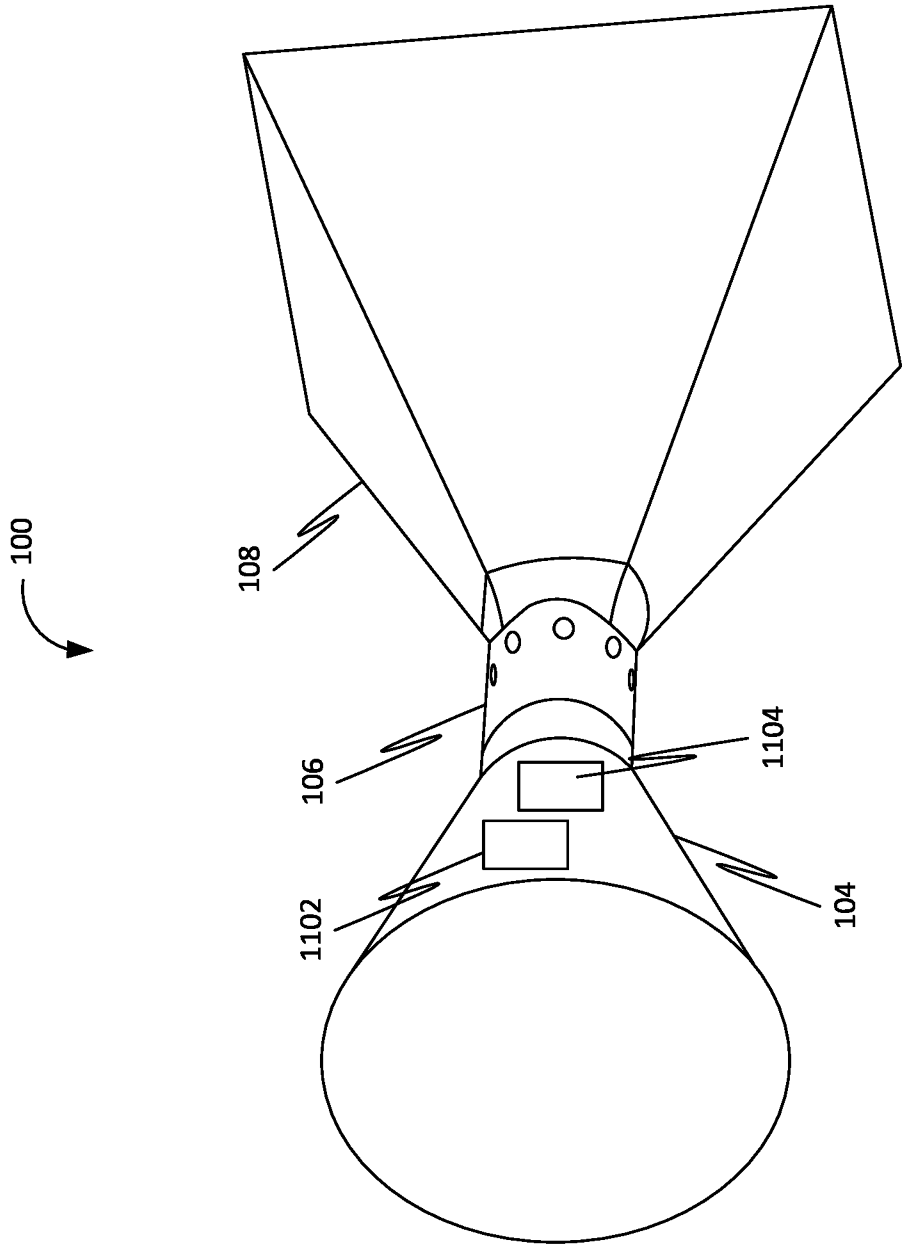
FIG. 11 is a side perspective view of the apparatus with the at least one heater, in accordance with some embodiments.

In further embodiments, the apparatus 100 may include at least one heater 1102, as shown in FIG. 11. Further, the at least one heater 1102 may include an electrically powered heating element. Further, the at least one heater 1102 may be disposed proximal to the first end 112 of the first portion 104. Further, the at least one heater 1102 may be configured for heating the fluid to one of a plurality of temperatures. Further, the heating of the fluid to one of the plurality of temperatures corresponds to pressurizing the fluid to one of a plurality of pressures. Further, one of the plurality of pressures corresponds to a velocity of the fluid flowing from the third interior space 120 to the second interior space 126 based on the fluid flowing from the third interior space 120 to the second interior space 126.

Figure 12:
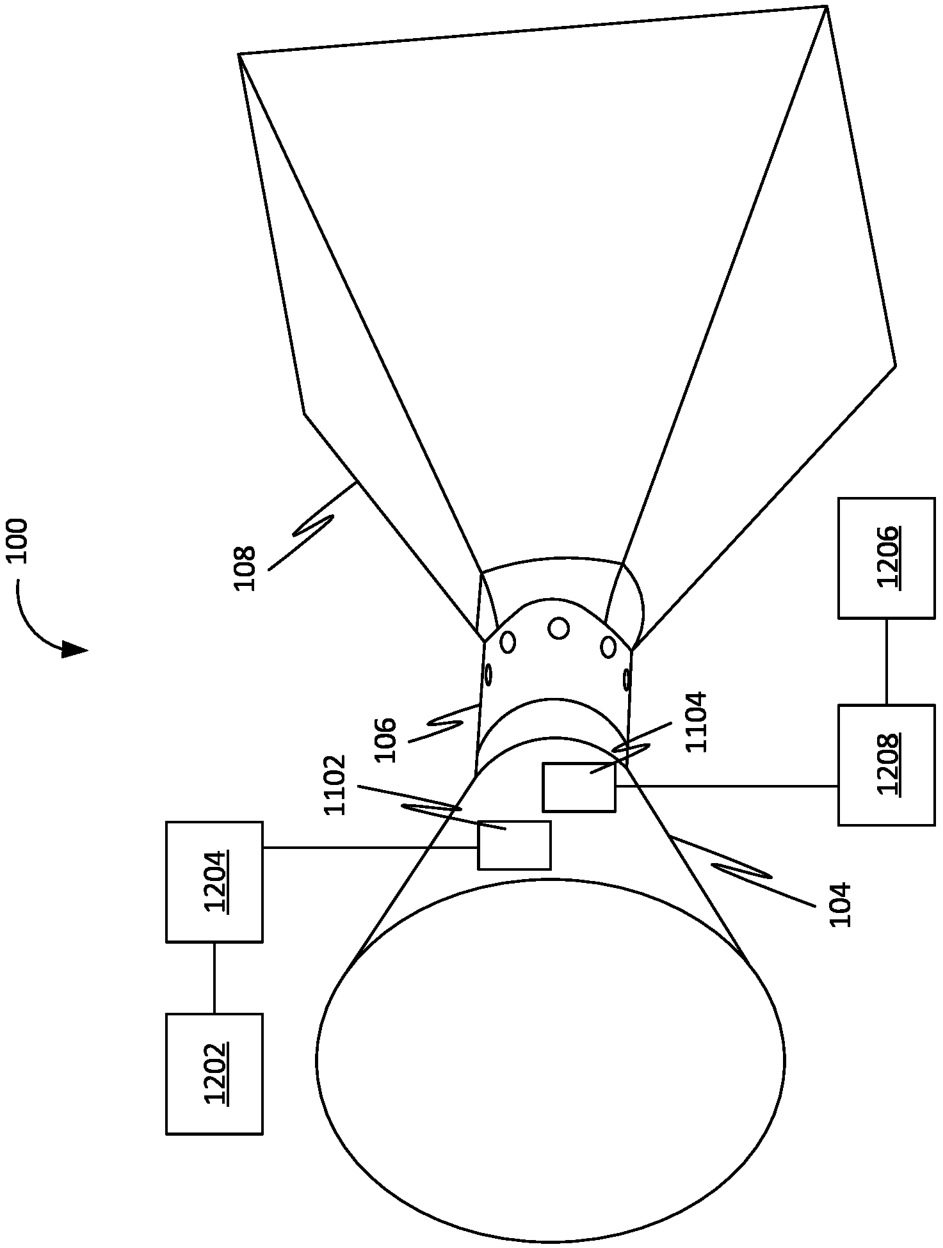
FIG. 12 is a side perspective view of the apparatus with the at least one heater, in accordance with some embodiments.

In further embodiments, the apparatus 100 may include at least one first sensor 1202 and a processing device 1204, as shown in FIG. 12. Further, the at least one first sensor 1202 may disposed on the first portion 104. Further, the at least one first sensor 1202 may be configured for generating at least one first sensor data based on detecting at least one of a velocity and a temperature of the fluid flowing through the apparatus 100. Further, the processing device 1204 may be communicatively coupled with the at least one first sensor 1202. Further, the processing device 1204 may be configured for analyzing the at least one first sensor data based on at least one first criterion. Further, the at least one first criterion may define the temperature which is required by the fluid for achieving the third velocity and the cyclonic flow pattern. Further, the processing device 1204 may be configured for determining one of the plurality of temperatures for the fluid and the temperature of the fluid based on the analyzing. Further, the processing device 1204 may be configured for generating a first command for the at least one heater 1102 based on the determining. Further, the at least one heater 1102 may be configured for heating the fluid to one of the plurality of temperatures based on the first command.

In further embodiments, the apparatus 100 may include at least one humidifier 1104, as shown in FIG. 11. Further, the at least one humidifier 1104 may be disposed proximal to the first end of the first portion. Further, the at least one humidifier 1104 may be configured for humidifying the fluid to one of a plurality of humidity levels. Further, the humidifying of the fluid to one of the plurality of humidity levels corresponds to creating the cyclonic flow pattern in the fluid flowing from the third interior space to the second interior space. Further, the fluid may include air. Further, the humidifying of the fluid to one of the plurality of humidity levels may include adding at least one amount of vapor of at least one fluid in the air. Further, the at least one fluid may include ater. Further, the at least one humidifier 1104 may include a central humidifier, an evaporator, an impeller humidifier, a vaporizer, and ultrasonic humidifier, etc.

In further embodiments, the apparatus 100 may include at least one second sensor 1206 and a processing device 1208, as shown in FIG. 12. Further, the at least one second sensor 1206 may be disposed on the first portion 104. Further, the at least one second sensor 1206 may be configured for generating at least one second sensor data based on detecting at least one a humidity level of the fluid flowing through the apparatus 100. Further, the processing device 1208 may be communicatively coupled with the at least one second sensor 1206. Further, the processing device 1208 may be configured for analyzing the at least one second sensor data based on at least one second criterion. Further, the processing device 1208 may be configured for determining one of the plurality of humidity levels for the fluid and the humidity level of the fluid based on the analyzing. Further, the processing device 1208 may be configured for generating a second command for the at least one humidifier 1104 based on the determining. Further, the at least one humidifier 1104 may be configured for humidifying the fluid to one of the plurality of humidity levels based on the second command.

Figure 2:
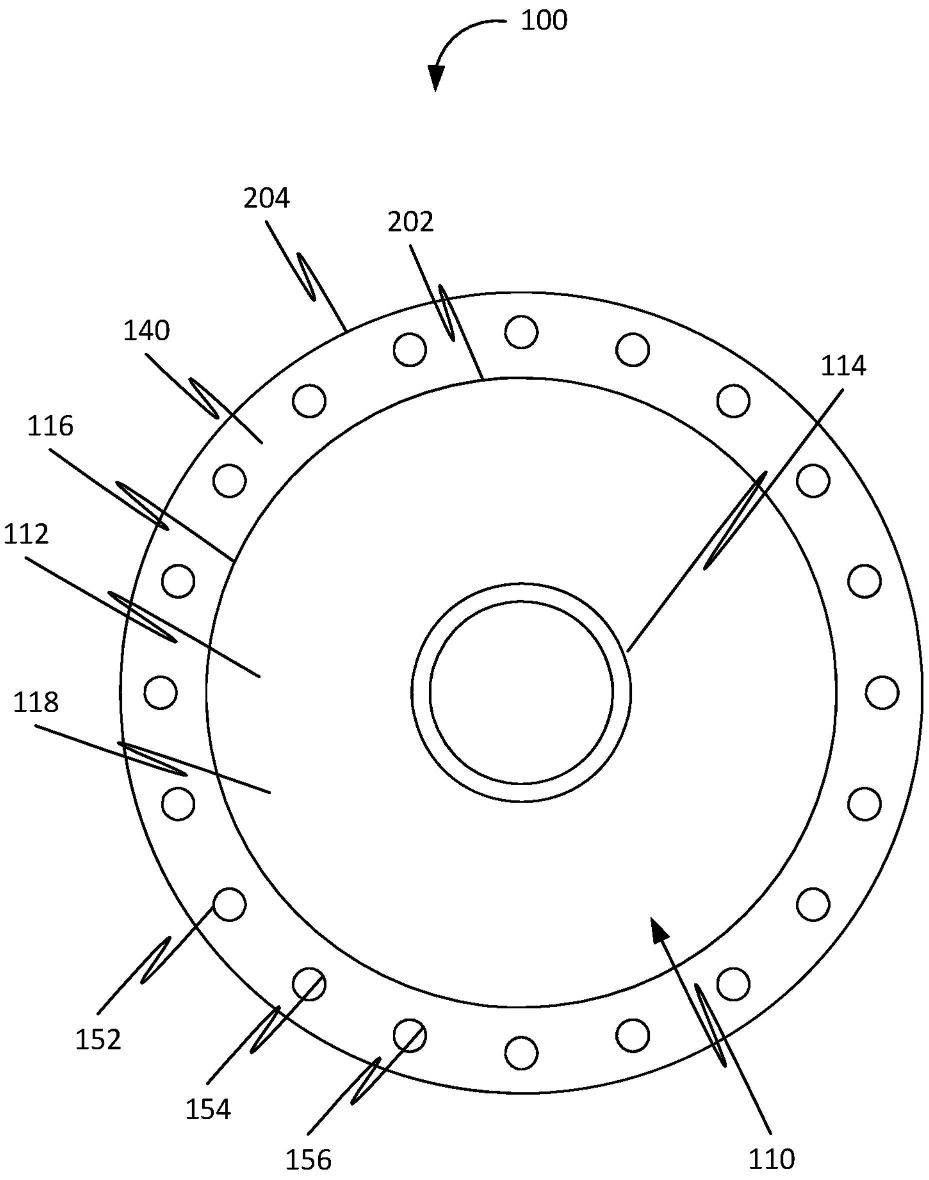
FIG. 2 is a front view of the apparatus, in accordance with some embodiments.

Further, in some embodiments, the first attachment member 140 may be a continuous protrusion. Further, the continuous protrusion may include a flat panel. Further, a proximal end 202, as shown in FIG. 2, of the continuous protrusion may be configured to be continuously attached to the inlet edge 116. Further, a distal end 204, as shown in FIG. 2, of the continuous protrusion may be configured to be continuously attached to the interior surface 136 at the first end 138 of the duct portion 102 using at least one fastening element for the continuously attaching of the inlet edge 116 at the first end 138 of the duct portion 102. Further, the at least one fastening element may include adhesive, fasteners, etc.

Further, in an embodiment, the continuous protrusion may be elastically extendable for conforming to an internal cross-section of the first end 138 of the duct portion 102. Further, the conforming to the internal cross-section allows continuous attaching the distal end to the interior surface 136 at the first end 138 of the duct portion 102.

Figure 4:
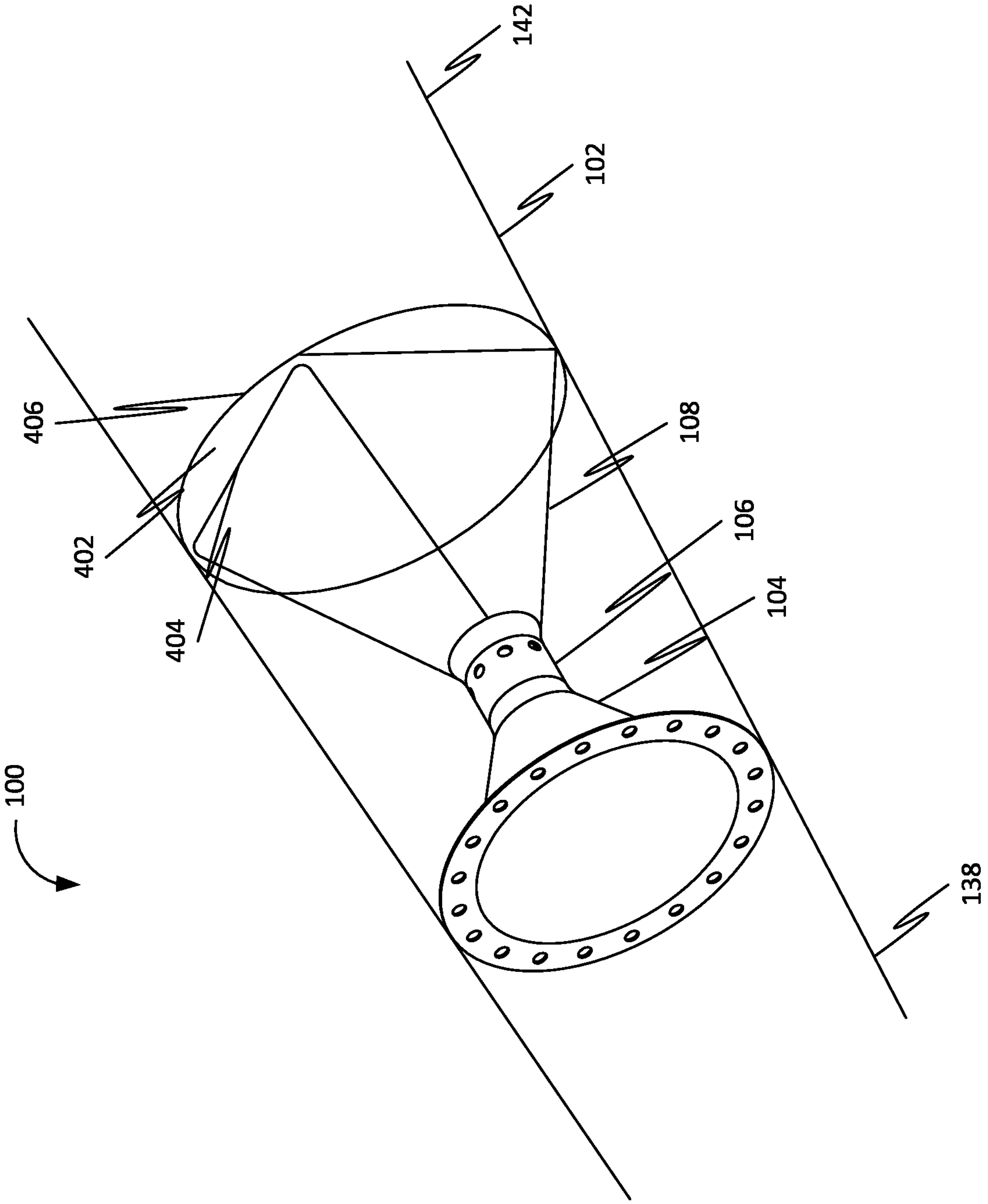
FIG. 4 is a top side perspective view of the apparatus with the duct portion, in accordance with some embodiments.

Further, in some embodiments, the outlet edge 132 may be configured to be continuously attached to the interior surface 136 of the duct portion 102 on the first end 138 of the duct portion 102 using a second attachment member 402, as shown in FIG. 4, of the second portion 108.

Further, in an embodiment, the second attachment member 402 may be a continuous protrusion. Further, a proximal end 404, as shown in FIG. 4, of the continuous protrusion may be configured to be continuously attached to the outlet edge 132. Further, a distal end 406, as shown in FIG. 4, of the continuous protrusion may be configured to be continuously attached to the interior surface 136 at the second end 142 of the duct portion 102 using at least one fastening element for the continuously attaching of the outlet edge 132 at the second end 142 of the duct portion 102.

Further, in an embodiment, the continuous protrusion may be elastically flexible for conforming to an internal cross-section of the second end 142 of the duct portion 102. Further, the conforming to the internal cross-section allows continuous attaching the distal end to the interior surface 136 at the second end 142 of the duct portion 102.

Further, in some embodiments, a cross-section of the second portion 108 decreases from the first end 128 of the second portion 108 to the second end 130 of the second portion 108 making the second interior space 126 tapered from the first end 128 of the second portion 108 to the second end 130 of the second portion 108.

Further, in an embodiment, a cross-section of the first portion 104 at the first end 112 of the first portion 104 may be smaller than a cross-section of the duct portion 102 at the first end 138 of the duct portion 102. Further, a cross-section of the first portion 104 at the second end 114 of the first portion 104 may be equal to a cross-section of the third portion 106 at the first end 122 of the third portion 106 and a cross-section of the second portion 108 at the second end 130 of the second portion 108 may be equal to a cross-section of the third portion 106 at the second end 124 of the third portion 106. Further, a cross-section of the second portion 108 at the first end 128 of the second portion 108 may be less than equal to a cross-section of the duct portion 102 at the second end 142 of the duct portion 102.

Further, in some embodiments, a cross-section of the first portion 104 at the first end 112 of the first portion 104 may be greater than a cross-section of the second portion 108 at the first end 128 of the second portion 108.

FIG. 2 is a front view of the apparatus 100, in accordance with some embodiments.

Figure 3:
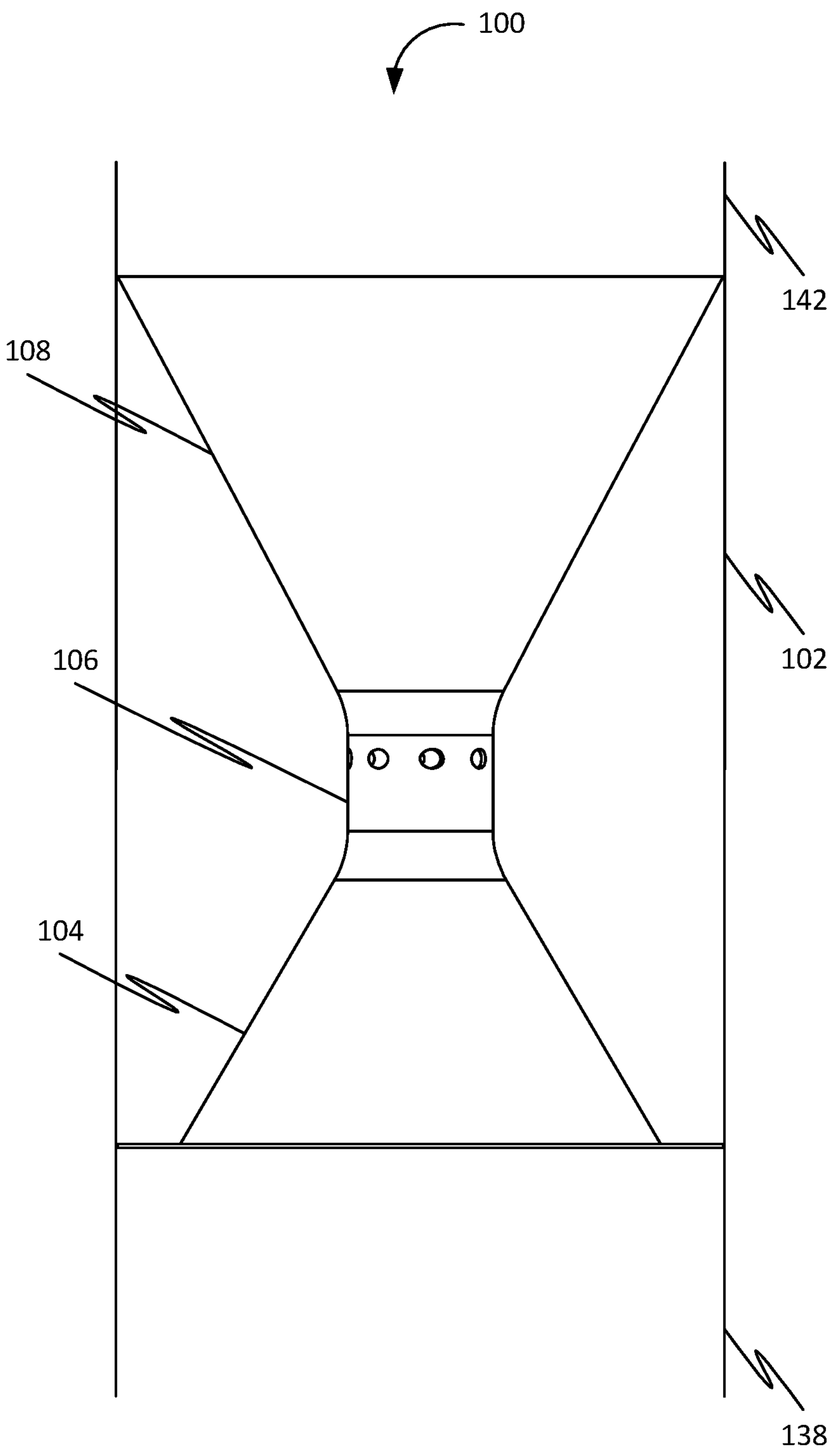
FIG. 3 is a top view of the apparatus, in accordance with some embodiments.

FIG. 3 is a top view of the apparatus 100, in accordance with some embodiments.

FIG. 4 is a top side perspective view of the apparatus 100 with the duct portion 102, in accordance with some embodiments.

Figure 5:
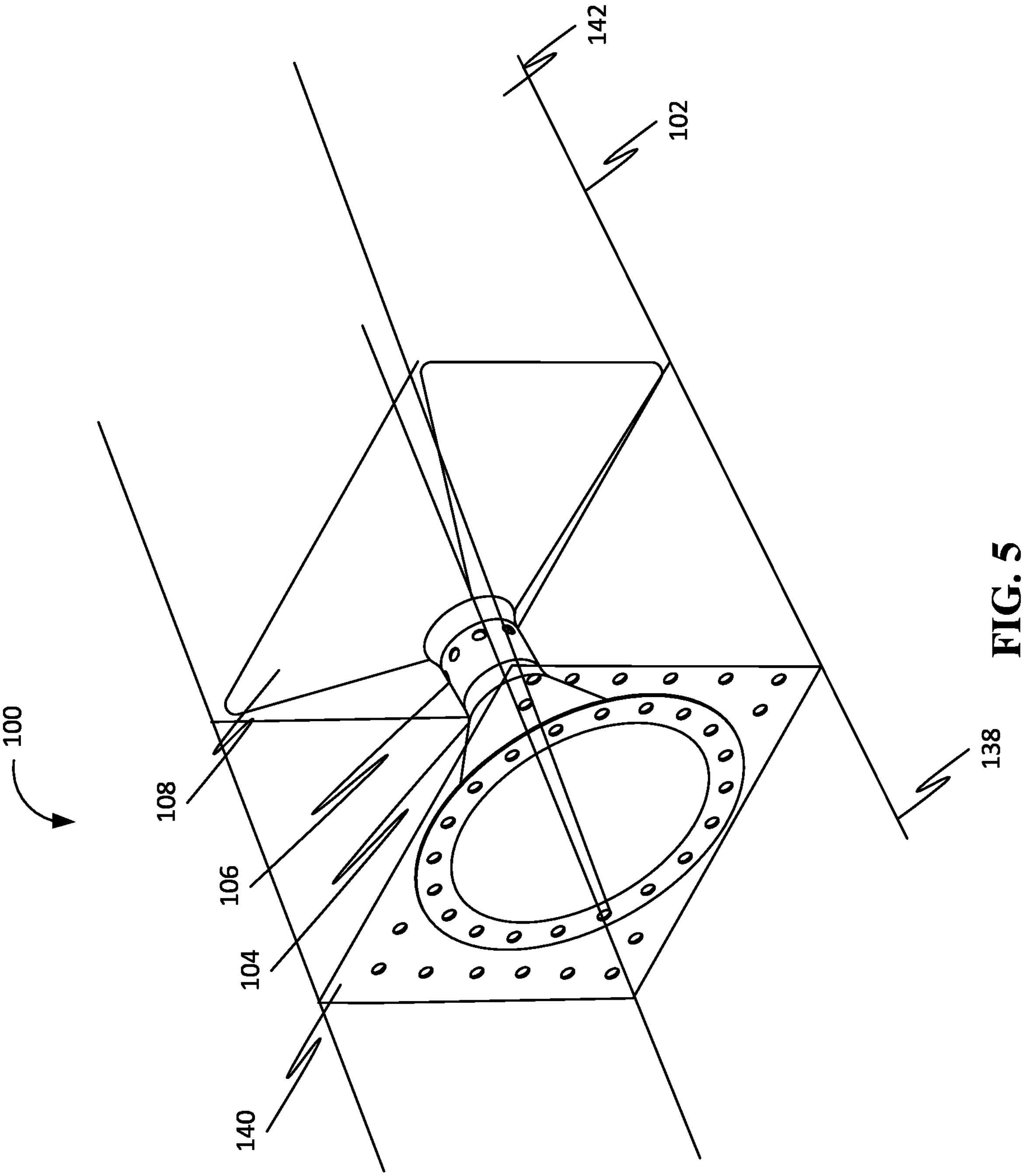
FIG. 5 is a top side perspective view of the apparatus with the duct portion, in accordance with some embodiments.

FIG. 5 is a top side perspective view of the apparatus 100 with the duct portion 102, in accordance with some embodiments.

Figure 6:
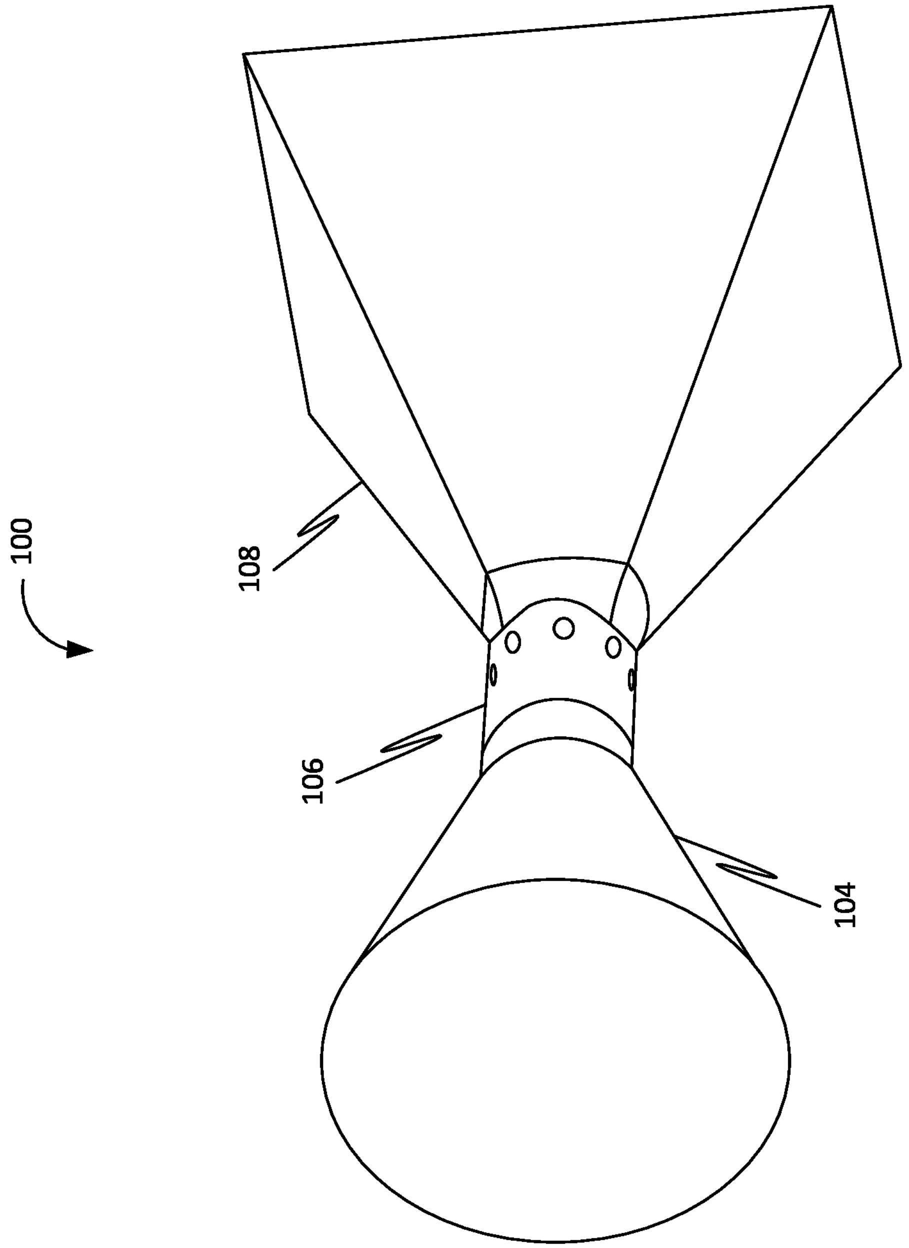
FIG. 6 is a side perspective view of the apparatus, in accordance with some embodiments.

FIG. 6 is a side perspective view of the apparatus 100, in accordance with some embodiments.

Figure 7:
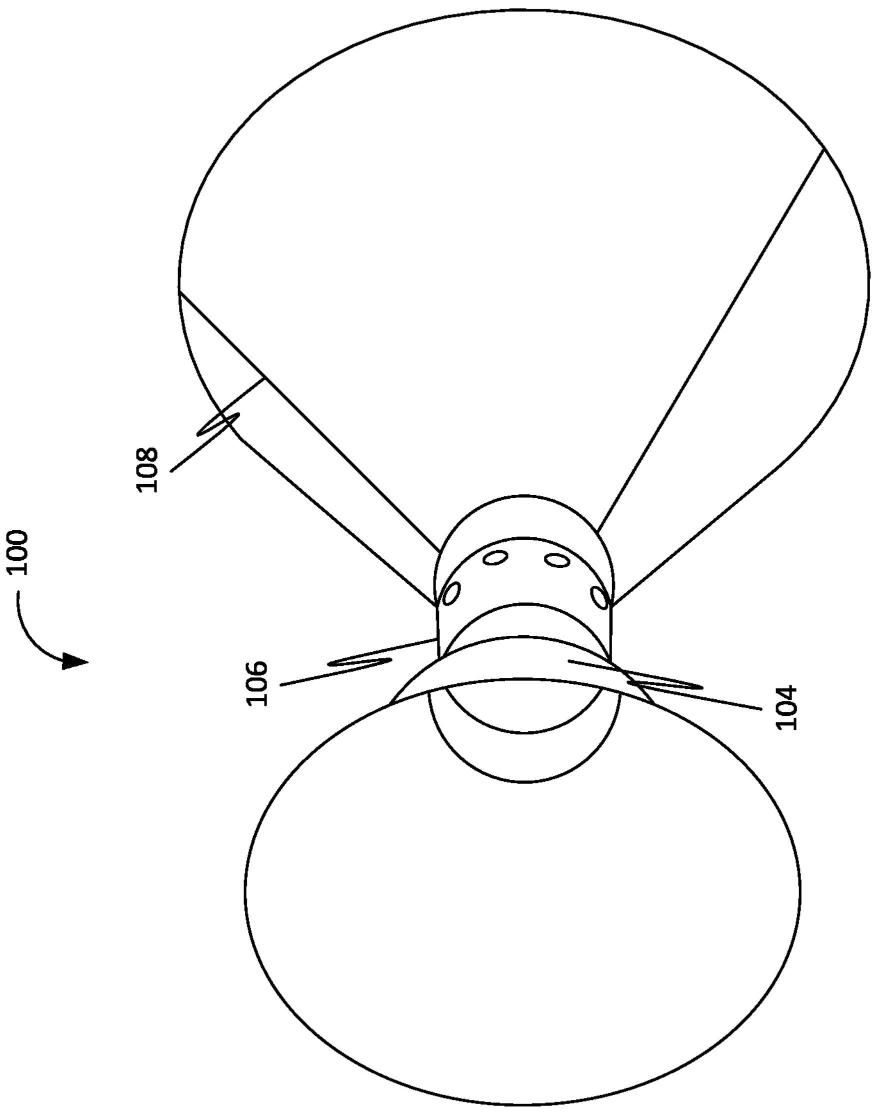
FIG. 7 is a side perspective view of the apparatus, in accordance with some embodiments.

FIG. 7 is a side perspective view of the apparatus 100, in accordance with some embodiments.

FIG. 8 is a cross-sectional view of the third portion 106 of the apparatus 100, in accordance with some embodiments.

FIG. 9 is a cross-sectional view of the third portion 106 of the apparatus 100 with the orientation control device 902, in accordance with some embodiments.

FIG. 10 is a cross-sectional view of the third portion 106 of the apparatus 100 with the orientation control device 902, in accordance with some embodiments.

FIG. 11 is a side perspective view of the apparatus 100 with the at least one heater 1102, in accordance with some embodiments.

FIG. 12 is a side perspective view of the apparatus 100 with the at least one heater 1102, in accordance with some embodiments.

Figure 13:
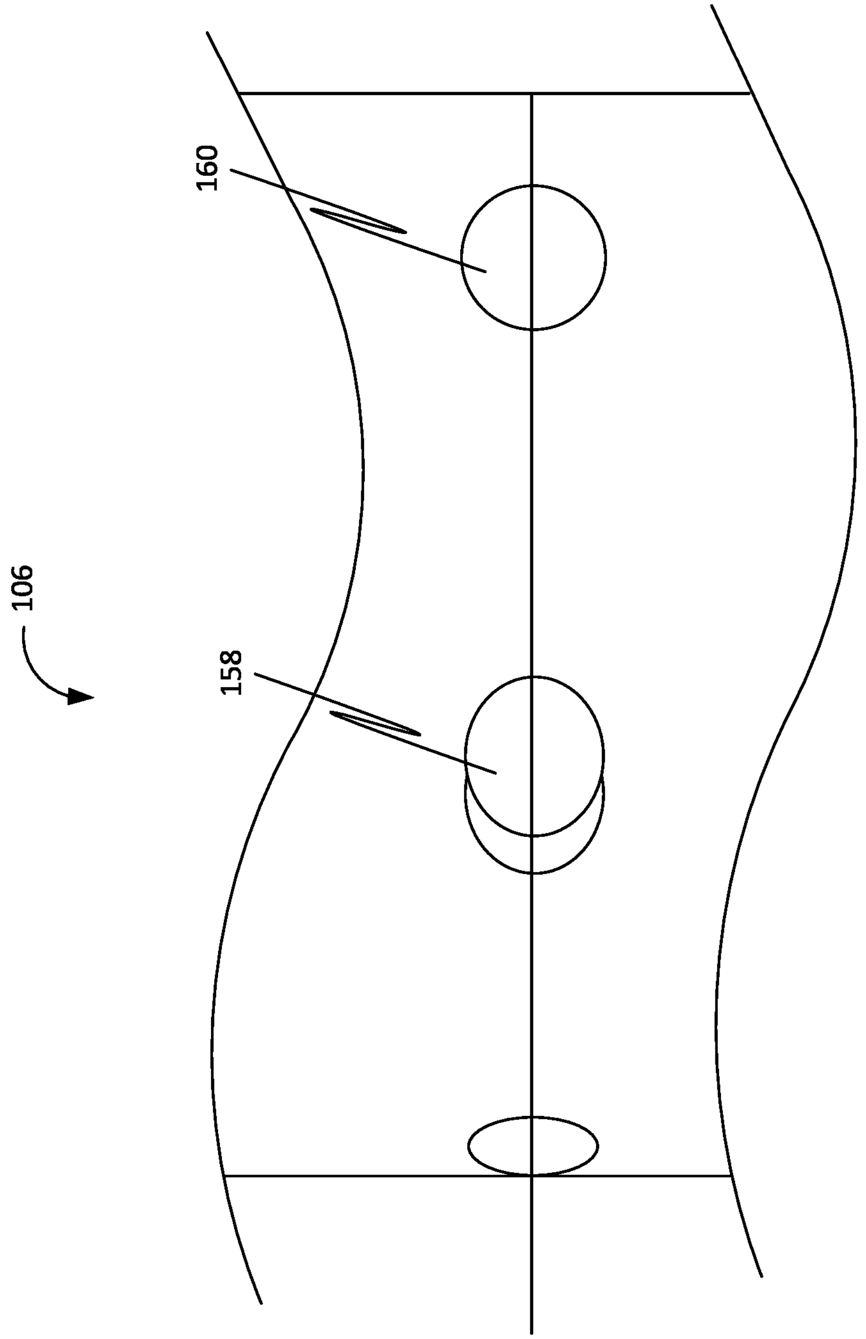
FIG. 13 is a partial view of the third portion of the apparatus, in accordance with some embodiments.

FIG. 13 is a partial view of the third portion 106 of the apparatus 100, in accordance with some embodiments.

Figure 14:
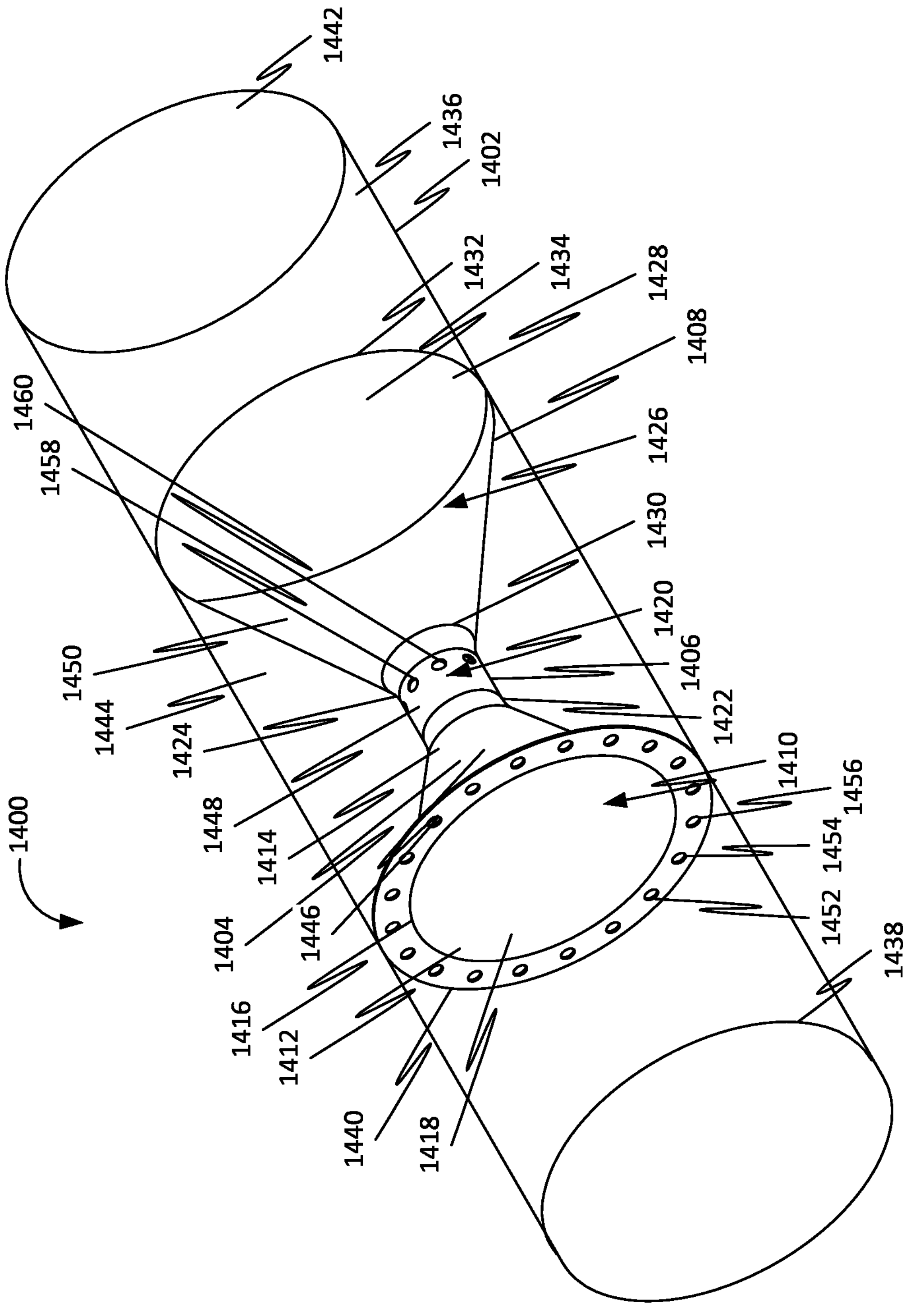
FIG. 14 is a top perspective view of an apparatus for facilitating improving flow of fluid in a duct with a duct portion of the duct, in accordance with some embodiments.

FIG. 14 is a top perspective view of an apparatus 1400 for facilitating improving flow of fluid in a duct with a duct portion 1402 of the duct, in accordance with some embodiments. Further, the apparatus 1400 may be configured to be fixed within the duct portion 1402 of the duct. Further, the apparatus 1400 may include a first portion 1404, a third portion 1406, and a second portion 1408.

Further, the first portion 1404 defines a first interior space 1410 between a first end 1412 of the first portion 1404 and a second end 1414 of the first portion 1404. Further, a cross-section of the first portion 1404 decreases from the first end 1412 of the first portion 1404 to the second end 1414 of the first portion 1404 making the first interior space 1410 tapered from the first end 1412 of the first portion 1404 to the second end 1414 of the first portion 1404. Further, the first portion 1404 may include an inlet edge 1416 on the first end 1412 of the first portion 1404 defining an inlet opening 1418 on the first end 1412 of the first portion 1404 leading into the first interior space 1410.

Further, the third portion 1406 defines a third interior space 1420 between a first end 1422 of the third portion 1406 and a second end 1424 of the third portion 1406. Further, the cross-section of the third portion 1406 remains constant from the first end 1422 of the third portion 1406 to the second end 1424 of the third portion 1406.

Further, the second portion 1408 defines a second interior space 1426 between a first end 1428 of the second portion 1408 and a second end 1430 of the second portion 1408. Further, a cross-section of the second portion 1408 decreases from the first end 1428 of the second portion 1408 to the second end 1430 of the second portion 1408 making the second interior space 1426 tapered from the first end 1428 of the second portion 1408 to the second end 1430 of the second portion 1408. Further, the second portion 1408 may include an outlet edge 1432 on the first end 1428 of the second portion 1408 defining an outlet opening 1434 on the first end 1428 of the second portion 1408. Further, the second end 1414 of the first portion 1404 may be coupled with the first end 1422 of the third portion 1406 and the second end 1430 of the second portion 1408 may be coupled with the second end 1424 of the third portion 1406 for fluidly coupling the first interior space 1410, the third interior space 1420, and the second interior space 1426. Further, the inlet edge 1416 may be configured to be continuously attached to an interior surface 1436 of the duct portion 1402 at a first end 1438 of the duct portion 1402 using a first attachment member 1440 of the first portion 1404. Further, the outlet edge 1432 may be configured to be continuously attached to the interior surface 1436 at a second end 1442 of the duct portion 1402. Further, continuously attaching the inlet edge 1416 to the first end 1438 of the duct portion 1402 and continuously attaching the outlet edge 1432 at the second end 1442 of the duct portion 1402 defines an interior space 1444 between the interior surface 1436 of the duct portion 1402 and a first exterior surface 1446 of the first portion 1404, a third exterior surface 1448 of the third portion 1406, and a second exterior surface 1450 of the second portion 1408. Further, the first attachment member 1440 may include at least one first opening 1452-1456 leading into the interior space 1444. Further, the third portion 1406 may include a plurality of second openings 1458-1460 for fluidly coupling the interior space 1444 with the third interior space 1420. Further, the fluid flows from the first end 1438 of the duct portion 1402 to the second end 1442 of the duct portion 1402 through the apparatus 1400. Further, a first amount of the fluid entering the first interior space 1410 through the inlet opening 1418 flows to the third interior space 1420 from the first interior space 1410 with a first velocity and a first direction and a second amount of the fluid enters the interior space 1444 through the at least one first opening 1452-1456. Further, a plurality of portions of the second amount of the fluid flows into the third interior space 1420 through the plurality of second openings 1458-1460 with a second velocity and a plurality of second directions corresponding to the plurality of second openings 1458-1460. Further, the plurality of portions of the second amount of the fluid interacts with the first amount of the fluid in the third interior space 1420. Further, the fluid flows from the third interior space 1420 to the second interior space 1426 with a third velocity and a cyclonic flow pattern for exiting the second interior space 1426 through the outlet opening 1434 based on interacting of the plurality of portions of the second amount of the fluid with the first amount of the fluid. Further, the third velocity may be greater than the first velocity and the second velocity.

Further, in some embodiments, the plurality of second openings 1458-1460 may be disposed on a plurality of surface portions of the third exterior surface 1448. Further, the plurality of second openings 1458-1460 may be oriented in a plurality of orientations. Further, each axis of a plurality of axes of each orientation of the plurality of orientations subtends an angle of a plurality of angles with a perpendicular axis of each of the plurality of surface portions. Further, the plurality of second directions corresponds to the plurality of orientations.

Further, in some embodiments, the first attachment member 1440 may be a continuous protrusion. Further, a proximal end of the continuous protrusion may be configured to be continuously attached to the inlet edge 1416. Further, a distal end of the continuous protrusion may be configured to be continuously attached to the interior surface 1436 at the first end 1438 of the duct portion 1402 using at least one fastening element for the continuously attaching of the inlet edge 1416 at the first end 1438 of the duct portion 1402.

Further, in some embodiments, a cross-section of the first portion 1404 at the first end 1412 of the first portion 1404 may be smaller than a cross-section of the duct portion 1402 at the first end 1438 of the duct portion 1402. Further, a cross-section of the first portion 1404 at the second end 1414 of the first portion 1404 may be equal to a cross-section of the third portion 1406 at the first end 1422 of the third portion 1406 and a cross-section of the second portion 1408 at the second end 1430 of the second portion 1408 may be equal to a cross-section of the third portion 1406 at the second end 1424 of the third portion 1406. Further, a cross-section of the second portion 1408 at the first end 1428 of the second portion 1408 may be less than equal to a cross-section of the duct portion 1402 at the second end 1442 of the duct portion 1402.

Figure 15:
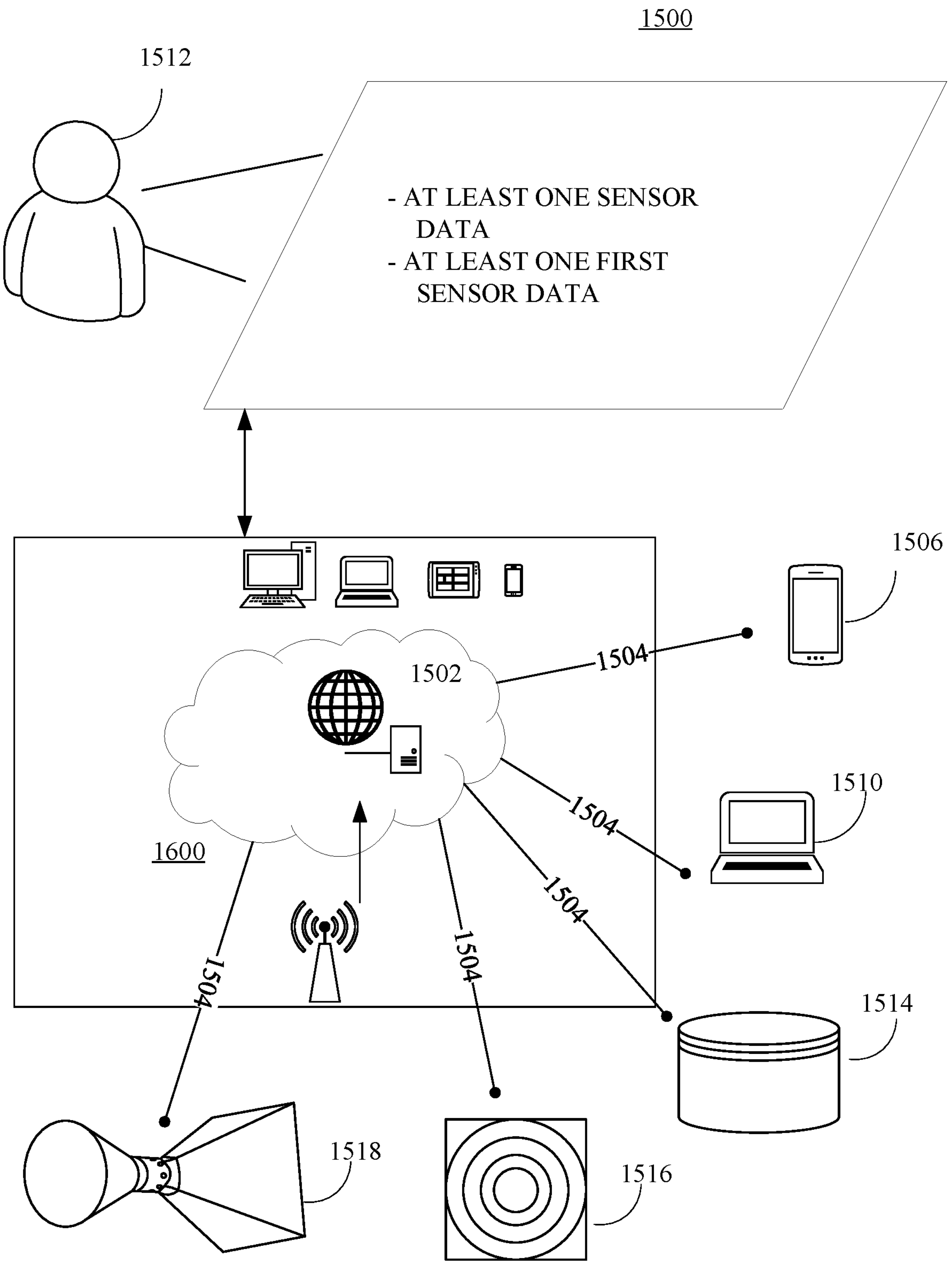
FIG. 15 is an illustration of an online platform consistent with various embodiments of the present disclosure.

FIG. 15 is an illustration of an online platform 1500 consistent with various embodiments of the present disclosure. By way of non-limiting example, the online platform 1500 to facilitate improving flow of fluid in a duct may be hosted on a centralized server 1502, such as, for example, a cloud computing service. The centralized server 1502 may communicate with other network entities, such as, for example, a mobile device 1506 (such as a smartphone, a laptop, a tablet computer, etc.), other electronic devices 1510 (such as desktop computers, server computers, etc.), databases 1514, sensors 1516, and an apparatus 1518 (such as the apparatus 100, the apparatus 1400, etc.) over a communication network 1504, such as, but not limited to, the Internet. Further, users of the online platform 1500 may include relevant parties such as, but not limited to, end-users, administrators, service providers, service consumers, and so on. Accordingly, in some instances, electronic devices operated by the one or more relevant parties may be in communication with the platform.

A user 1512, such as the one or more relevant parties, may access online platform 1500 through a web based software application or browser. The web based software application may be embodied as, for example, but not be limited to, a website, a web application, a desktop application, and a mobile application compatible with a computing device 1600.

Figure 16:
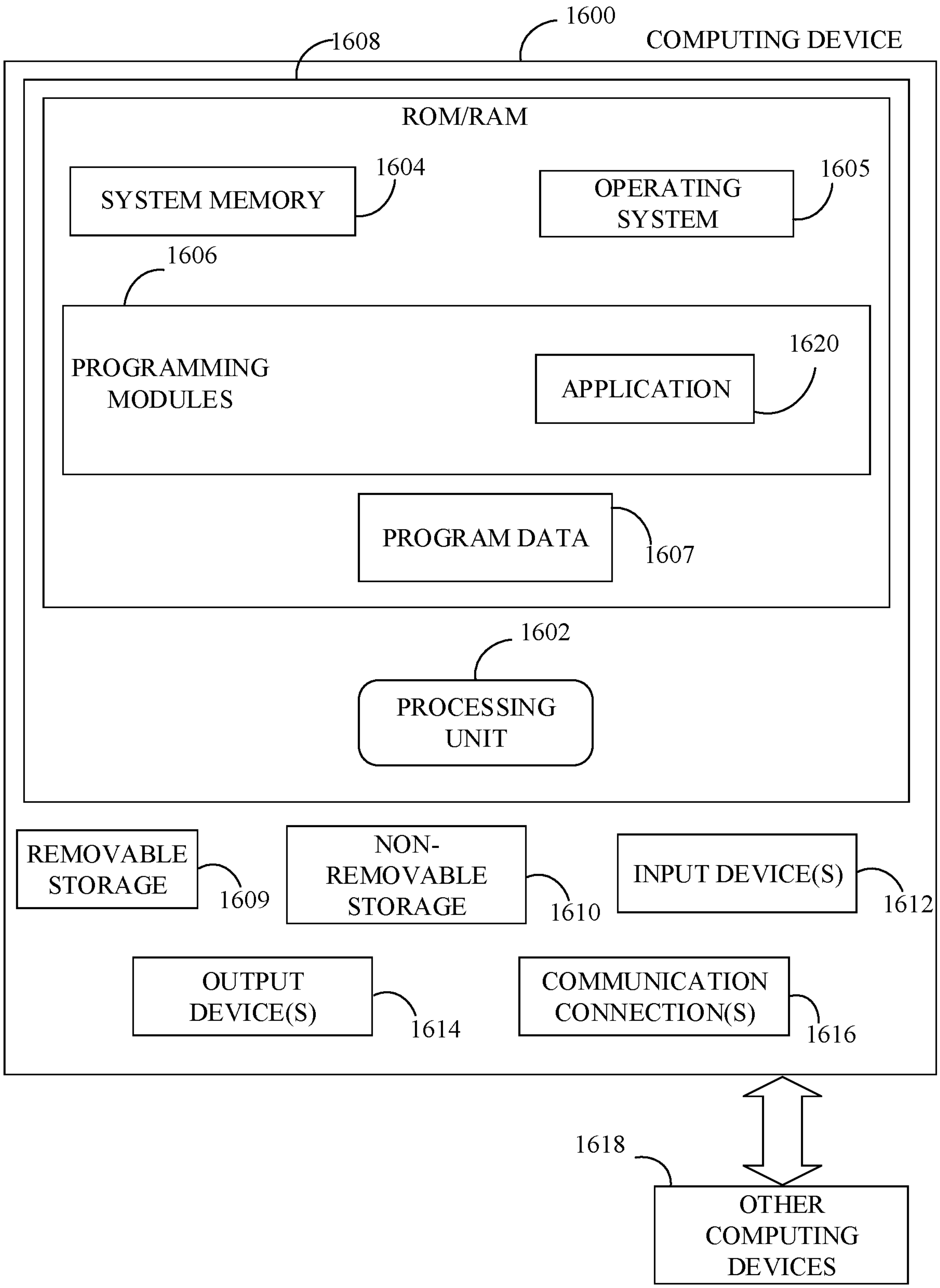
FIG. 16 is a block diagram of a computing device for implementing the methods disclosed herein, in accordance with some embodiments.

With reference to FIG. 16, a system consistent with an embodiment of the disclosure may include a computing device or cloud service, such as computing device 1600. In a basic configuration, computing device 1600 may include at least one processing unit 1602 and a system memory 1604. Depending on the configuration and type of computing device, system memory 1604 may comprise, but is not limited to, volatile (e.g. random-access memory (RAM)), non-volatile (e.g. read-only memory (ROM)), flash memory, or any combination. System memory 1604 may include operating system 1605, one or more programming modules 1606, and may include a program data 1607. Operating system 1605, for example, may be suitable for controlling computing device 1600's operation. In one embodiment, programming modules 1606 may include image-processing module, machine learning module. Furthermore, embodiments of the disclosure may be practiced in conjunction with a graphics library, other operating systems, or any other application program and is not limited to any particular application or system. This basic configuration is illustrated in FIG. 16 by those components within a dashed line 1608.

Computing device 1600 may have additional features or functionality. For example, computing device 1600 may also include additional data storage devices (removable and/or non-removable) such as, for example, magnetic disks, optical disks, or tape. Such additional storage is illustrated in FIG. 16 by a removable storage 1609 and a non-removable storage 1610. Computer storage media may include volatile and non-volatile, removable and non-removable media implemented in any method or technology for storage of information, such as computer-readable instructions, data structures, program modules, or other data. System memory 1604, removable storage 1609, and non-removable storage 1610 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1600. Any such computer storage media may be part of device 1600. Computing device 1600 may also have input device(s) 1612 such as a keyboard, a mouse, a pen, a sound input device, a touch input device, a location sensor, a camera, a biometric sensor, etc. Output device(s) 1614 such as a display, speakers, a printer, etc. may also be included. The aforementioned devices are examples and others may be used.

Computing device 1600 may also contain a communication connection 1616 that may allow device 1600 to communicate with other computing devices 1618, such as over a network in a distributed computing environment, for example, an intranet or the Internet. Communication connection 1616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1604, including operating system 1605. While executing on processing unit 1602, programming modules 1606 (e.g., application 1620 such as a media player) may perform processes including, for example, one or more stages of methods, algorithms, systems, applications, servers, databases as described above. The aforementioned process is an example, and processing unit 1602 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

What is claimed is:

1. An apparatus for facilitating improving flow of fluid in a duct, wherein the apparatus is configured to be fixed within a duct portion of the duct, wherein the apparatus comprises:

a first portion defining a first interior space between a first end of the first portion and a second end of the first portion, wherein a cross-section of the first portion decreases from the first end of the first portion to the second end of the first portion making the first interior space tapered from the first end of the first portion to the second end of the first portion, wherein the first portion comprises an inlet edge on the first end of the first portion defining an inlet opening on the first end of the first portion leading into the first interior space;

a third portion defining a third interior space between a first end of the third portion and a second end of the third portion, wherein the cross-section of the third portion remains constant from the first end of the third portion to the second end of the third portion; and a second portion defining a second interior space between a first end of the second portion and a second end of the second portion, wherein the second portion comprises an outlet edge on the first end of the second portion defining an outlet opening on the first end of the second portion, wherein the second end of the first portion is coupled with the first end of the third portion and the second end of the second portion is coupled with the second end of the third portion for fluidly coupling the first interior space, the third interior space, and the second interior space, wherein the inlet edge is configured to be continuously attached to an interior surface of the duct portion at a first end of the duct portion using a first attachment member of the first portion, wherein the outlet edge is configured to be continuously attached to the interior surface at a second end of the duct portion, wherein continuously attaching the inlet edge to the first end of the duct portion and continuously attaching the outlet edge at the second end of the duct portion defines an interior space between the interior surface of the duct portion and a first exterior surface of the first portion, a third exterior surface of the third portion, and a second exterior surface of the second portion, wherein the first attachment member comprises at least one first opening leading into the interior space, wherein the third portion comprises a plurality of second openings for fluidly coupling the interior space with the third interior space, wherein the fluid flows from the first end of the duct portion to the second end of the duct portion through the apparatus, wherein a first amount of the fluid entering the first interior space through the inlet opening flows to the third interior space from the first interior space with a first velocity and a first direction and a second amount of the fluid enters the interior space through the at least one first opening, wherein a plurality of portions of the second amount of the fluid flows into the third interior space through the plurality of second openings with a second velocity and a plurality of second directions corresponding to the plurality of second openings, wherein the plurality of portions of the second amount of the fluid interacts with the first amount of the fluid in the third interior space, wherein the fluid flows from the third interior space to the second interior space with a third velocity and a cyclonic flow pattern for exiting the second interior space through the outlet opening based on interacting of the plurality of portions of the second amount of the fluid with the first amount of the fluid, wherein the third velocity is greater than the first velocity and the second velocity.

2. The apparatus of claim 1, wherein the plurality of second openings are disposed on a plurality of surface portions of the third exterior surface, wherein the plurality of second openings is oriented in a plurality of orientations, wherein each axis of a plurality of axes of each orientation of the plurality of orientations subtends an angle of a plurality of angles with a perpendicular axis of each of the plurality of surface portions, wherein the plurality of second directions correspond to the plurality of orientations.

3. The apparatus of claim 2, wherein the plurality of angles are equal.

4. The apparatus of claim 2, wherein the plurality of angles are unequal.

5. The apparatus of claim 2 further comprising an orientation control device coupled with each of the plurality of second openings, wherein the orientation control device is an annular structure defining a central opening, wherein the orientation control device is configured to be rotated between a plurality of positions, wherein the plurality of positions correspond to the plurality of orientations of the central opening.

6. The apparatus of claim 5 further comprising:

at least one sensor disposed on the first portion, wherein the at least one sensor is configured for generating at least one sensor data based on detecting a velocity of the fluid flowing through the apparatus;

a processing device communicatively coupled with the at least one sensor, wherein the processing device is configured for:

analyzing the at least one sensor data based on at least one criterion;

determining one of the plurality of orientations for each of the plurality of second openings based on the analyzing; and generating a command for the orientation control device based on the determining; and at least one actuator communicatively coupled with the processing device, wherein the at least one actuator is operationally coupled with the orientation control device, wherein the at least one actuator is configured for rotating the orientation control device to one of the plurality of positions corresponding to one of the plurality of orientations based on the command.

7. The apparatus of claim 1 further comprising at least one heater disposed proximal to the first end of the first portion, wherein the at least one heater is configured for heating the fluid to one of a plurality of temperatures, wherein the heating of the fluid to one of the plurality of temperatures corresponds to pressurizing the fluid to one of a plurality of pressures, wherein one of the plurality of pressures corresponds to a velocity of the fluid flowing from the third interior space to the second interior space based on the fluid flowing from the third interior space to the second interior space.

8. The apparatus of claim 7 further comprising:

at least one first sensor disposed on the first portion, wherein the at least one first sensor is configured for generating at least one first sensor data based on detecting at least one of a velocity and a temperature of the fluid flowing through the apparatus; and a processing device communicatively coupled with the at least one first sensor, wherein the processing device is configured for:

analyzing the at least one first sensor data based on at least one first criterion;

determining one of the plurality of temperatures for the fluid and the temperature of the fluid based on the analyzing; and generating a first command for the at least one heater based on the determining, wherein the at least one heater is configured for heating the fluid to one of the plurality of temperatures based on the first command.

9. The apparatus of claim 1 further comprising at least one humidifier disposed proximal to the first end of the first portion, wherein the at least one humidifier is configured for humidifying the fluid to one of a plurality of humidity levels, wherein the humidifying of the fluid to one of the plurality of humidity levels corresponds to creating the cyclonic flow pattern in the fluid flowing from the third interior space to the second interior space.

10. The apparatus of claim 9 further comprising:

at least one second sensor disposed on the first portion, wherein the at least one second sensor is configured for generating at least one second sensor data based on detecting at least one a humidity level of the fluid flowing through the apparatus; and a processing device communicatively coupled with the at least one second sensor, wherein the processing device is configured for:

analyzing the at least one second sensor data based on at least one second criterion;

determining one of the plurality of humidity levels for the fluid and the humidity level of the fluid based on the analyzing; and generating a second command for the at least one humidifier based on the determining, wherein the at least one humidifier is configured for humidifying the fluid to one of the plurality of humidity levels based on the second command.

11. The apparatus of claim 1, wherein the first attachment member is a continuous protrusion, wherein a proximal end of the continuous protrusion is configured to be continuously attached to the inlet edge, wherein a distal end of the continuous protrusion is configured to be continuously attached to the interior surface at the first end of the duct portion using at least one fastening element for the continuously attaching of the inlet edge at the first end of the duct portion.

12. The apparatus of claim 11, wherein the continuous protrusion is elastically extendable for conforming to an internal cross-section of the first end of the duct portion, wherein the conforming to the internal cross-section allows continuous attaching the distal end to the interior surface at the first end of the duct portion.

13. The apparatus of claim 1, wherein the outlet edge is configured to be continuously attached to the interior surface of the duct portion on the first end of the duct portion using a second attachment member of the second portion.

14. The apparatus of claim 13, wherein the second attachment member is a continuous protrusion, wherein a proximal end of the continuous protrusion is configured to be continuously attached to the outlet edge, wherein a distal end of the continuous protrusion is configured to be continuously attached to the interior surface at the second end of the duct portion using at least one fastening element for the continuously attaching of the outlet edge at the second end of the duct portion.

15. The apparatus of claim 14, wherein the continuous protrusion is elastically flexible for conforming to an internal cross-section of the second end of the duct portion, wherein the conforming to the internal cross-section allows continuous attaching the distal end to the interior surface at the second end of the duct portion.

16. The apparatus of claim 1, wherein a cross-section of the second portion decreases from the first end of the second portion to the second end of the second portion making the second interior space tapered from the first end of the second portion to the second end of the second portion.

17. The apparatus of claim 16, wherein a cross-section of the first portion at the first end of the first portion is smaller than a cross-section of the duct portion at the first end of the duct portion, wherein a cross-section of the first portion at the second end of the first portion is equal to a cross-section of the third portion at the first end of the third portion and a cross-section of the second portion at the second end of the second portion is equal to a cross-section of the third portion at the second end of the third portion, wherein a cross-section of the second portion at the first end of the second portion is less than equal to a cross-section of the duct portion at the second end of the duct portion.

18. The apparatus of claim 1, wherein a cross-section of the first portion at the first end of the first portion is greater than a cross-section of the second portion at the first end of the second portion.

19. An apparatus for facilitating improving flow of fluid in a duct, wherein the apparatus is configured to be fixed within a duct portion of the duct, wherein the apparatus comprises:

a first portion defining a first interior space between a first end of the first portion and a second end of the first portion, wherein a cross-section of the first portion decreases from the first end of the first portion to the second end of the first portion making the first interior space tapered from the first end of the first portion to the second end of the first portion, wherein the first portion comprises an inlet edge on the first end of the first portion defining an inlet opening on the first end of the first portion leading into the first interior space;

a third portion defining a third interior space between a first end of the third portion and a second end of the third portion, wherein the cross-section of the third portion remains constant from the first end of the third portion to the second end of the third portion; and a second portion defining a second interior space between a first end of the second portion and a second end of the second portion, wherein a cross-section of the second portion decreases from the first end of the second portion to the second end of the second portion making the second interior space tapered from the first end of the second portion to the second end of the second portion, wherein the second portion comprises an outlet edge on the first end of the second portion defining an outlet opening on the first end of the second portion, wherein the second end of the first portion is coupled with the first end of the third portion and the second end of the second portion is coupled with the second end of the third portion for fluidly coupling the first interior space, the third interior space, and the second interior space, wherein the inlet edge is configured to be continuously attached to an interior surface of the duct portion at a first end of the duct portion using a first attachment member of the first portion, wherein the outlet edge is configured to be continuously attached to the interior surface at a second end of the duct portion, wherein continuously attaching the inlet edge to the first end of the duct portion and continuously attaching the outlet edge at the second end of the duct portion defines an interior space between the interior surface of the duct portion and a first exterior surface of the first portion, a third exterior surface of the third portion, and a second exterior surface of the second portion, wherein the first attachment member comprises at least one first opening leading into the interior space, wherein the third portion comprises a plurality of second openings for fluidly coupling the interior space with the third interior space, wherein the fluid flows from the first end of the duct portion to the second end of the duct portion through the apparatus, wherein a first amount of the fluid entering the first interior space through the inlet opening flows to the third interior space from the first interior space with a first velocity and a first direction and a second amount of the fluid enters the interior space through the at least one first opening, wherein a plurality of portions of the second amount of the fluid flows into the third interior space through the plurality of second openings with a second velocity and a plurality of second directions corresponding to the plurality of second openings, wherein the plurality of portions of the second amount of the fluid interacts with the first amount of the fluid in the third interior space, wherein the fluid flows from the third interior space to the second interior space with a third velocity and a cyclonic flow pattern for exiting the second interior space through the outlet opening based on interacting of the plurality of portions of the second amount of the fluid with the first amount of the fluid, wherein the third velocity is greater than the first velocity and the second velocity.

20. The apparatus of claim 19, wherein the plurality of second openings are disposed on a plurality of surface portions of the third exterior surface, wherein the plurality of second openings is oriented in a plurality of orientations, wherein each axis of a plurality of axes of each orientation of the plurality of orientations subtends an angle of a plurality of angles with a perpendicular axis of each of the plurality of surface portions, wherein the plurality of second directions correspond to the plurality of orientations.

* * * * *